(12) United States Patent
Kudo et al.

(10) Patent No.: US 9,159,342 B2
(45) Date of Patent: Oct. 13, 2015

(54) MAGNETIC RECORDING APPARATUS

(71) Applicant: Kabushiki Kaisha Toshiba, Minato-ku (JP)

(72) Inventors: Kiwamu Kudo, Kamakura (JP); Tazumi Nagasawa, Yokohama (JP); Hirofumi Suto, Tokyo (JP); Tao Yang, Yokohama (JP); Koichi Mizushima, Kamakura (JP); Rie Sato, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 14/483,552

(22) Filed: Sep. 11, 2014

(65) Prior Publication Data

US 2015/0077883 A1    Mar. 19, 2015

(30) Foreign Application Priority Data

Sep. 18, 2013  (JP) .................................. 2013-193469

(51) Int. Cl.
*G11B 5/127* (2006.01)
*G11B 5/31* (2006.01)
*G11B 5/00* (2006.01)

(52) U.S. Cl.
CPC ........ *G11B 5/314* (2013.01); *G11B 2005/0024* (2013.01)

(58) Field of Classification Search
CPC .......... G11B 2005/0024; G11B 5/314; G11B 5/3146; G11B 2005/0005; G11B 5/3133; G11B 5/3903; G11B 2005/001; H01L 43/08; G01R 33/093; G01R 33/1284; B82Y 25/00; H03B 15/006

USPC ................ 360/125.3, 128; 365/158, 171, 173
See application file for complete search history.

(56) References Cited

U.S. PATENT DOCUMENTS 6,954,331 B2 * 10/2005 Crawford et al. .......... 360/125.3
7,813,087 B2 * 10/2010 Sato et al. .................. 360/324.1
(Continued)

FOREIGN PATENT DOCUMENTS

JP          2005-25831        1/2005
JP          2010-205975       9/2010
(Continued)

OTHER PUBLICATIONS

English-machine translation of Akiyama et al. (JP 2012-160573 A) published on Aug. 23, 2012.*
Office Action issued Jun. 3, 2014 in Japanese patent Application No. 2013-193469 ( with English Translation).

(Continued)

*Primary Examiner* — Will J Klimowicz
(74) *Attorney, Agent, or Firm* — Oblon, McClelland, Maier & Neustadt, L.L.P.

(57) ABSTRACT

According to an embodiment, a magnetic recording apparatus includes following elements. The spin torque oscillator generates a first oscillating magnetic field. The recording medium unit includes one or more recording medium layers which are stacked, each of the one or more recording medium layers including a recording medium and spin-wave lines each of which generates a second oscillating magnetic field. The write magnetic field source generates a write magnetic field. The controller is configured to control the spin torque oscillator, the spin-wave lines, and the write magnetic field source to simultaneously apply the write magnetic field, and the first and second oscillating magnetic fields to target medium magnetization in the recording medium.

12 Claims, 15 Drawing Sheets

(56) References Cited

U.S. PATENT DOCUMENTS

| | | | |
|---|---|---|---|
| 2005/0023938 A1 | 2/2005 | Sato et al. | |
| 2005/0219771 A1* | 10/2005 | Sato et al. | 360/324.2 |
| 2007/0296516 A1 | 12/2007 | Eshaghian-Wilner et al. | |
| 2009/0310244 A1* | 12/2009 | Shimazawa et al. | 360/75 |
| 2010/0075599 A1 | 3/2010 | Xi et al. | |
| 2010/0225312 A1 | 9/2010 | Nakamura et al. | |
| 2012/0075752 A1 | 3/2012 | Sato et al. | |
| 2013/0083595 A1* | 4/2013 | Nakamura et al. | 365/171 |
| 2013/0222941 A1* | 8/2013 | Sugiura et al. | 360/75 |

FOREIGN PATENT DOCUMENTS

| | | |
|---|---|---|
| JP | 2012-74101 | 4/2012 |
| JP | 2012-160573 | 8/2012 |
| JP | 2013-175250 | 9/2013 |
| WO | WO 2011/030449 A1 | 3/2011 |

OTHER PUBLICATIONS

Christophe Thirion et al. "Switching of magnetization by nonlinear resonance studied in single nanoparticles", Letters, Nature Publishing Group, 2003, 4 pages.

* cited by examiner

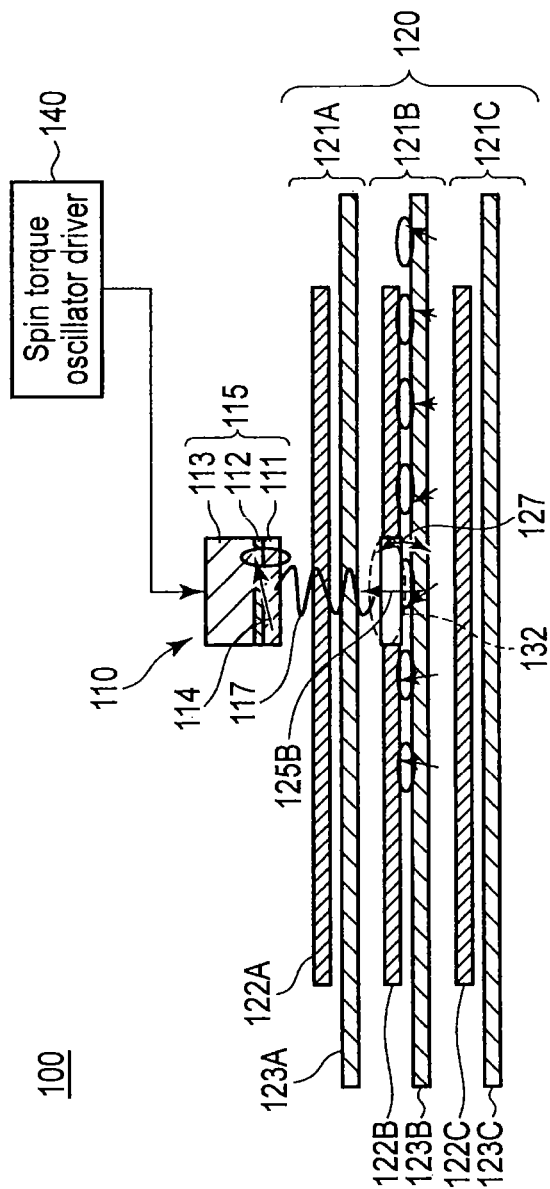
F I G. 1

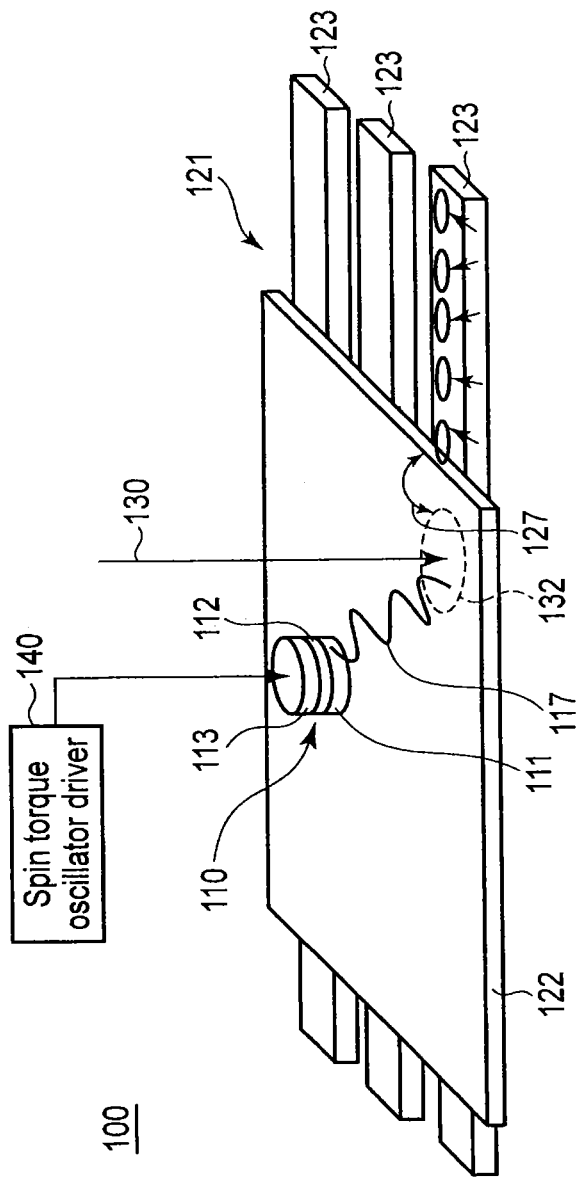
F I G. 2

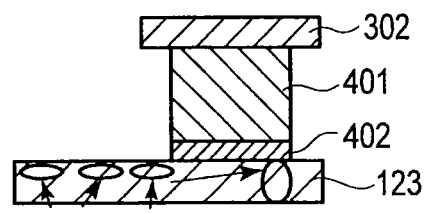
F I G. 4A
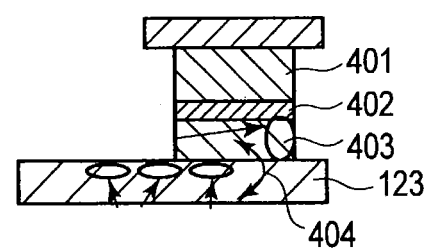
F I G. 4B

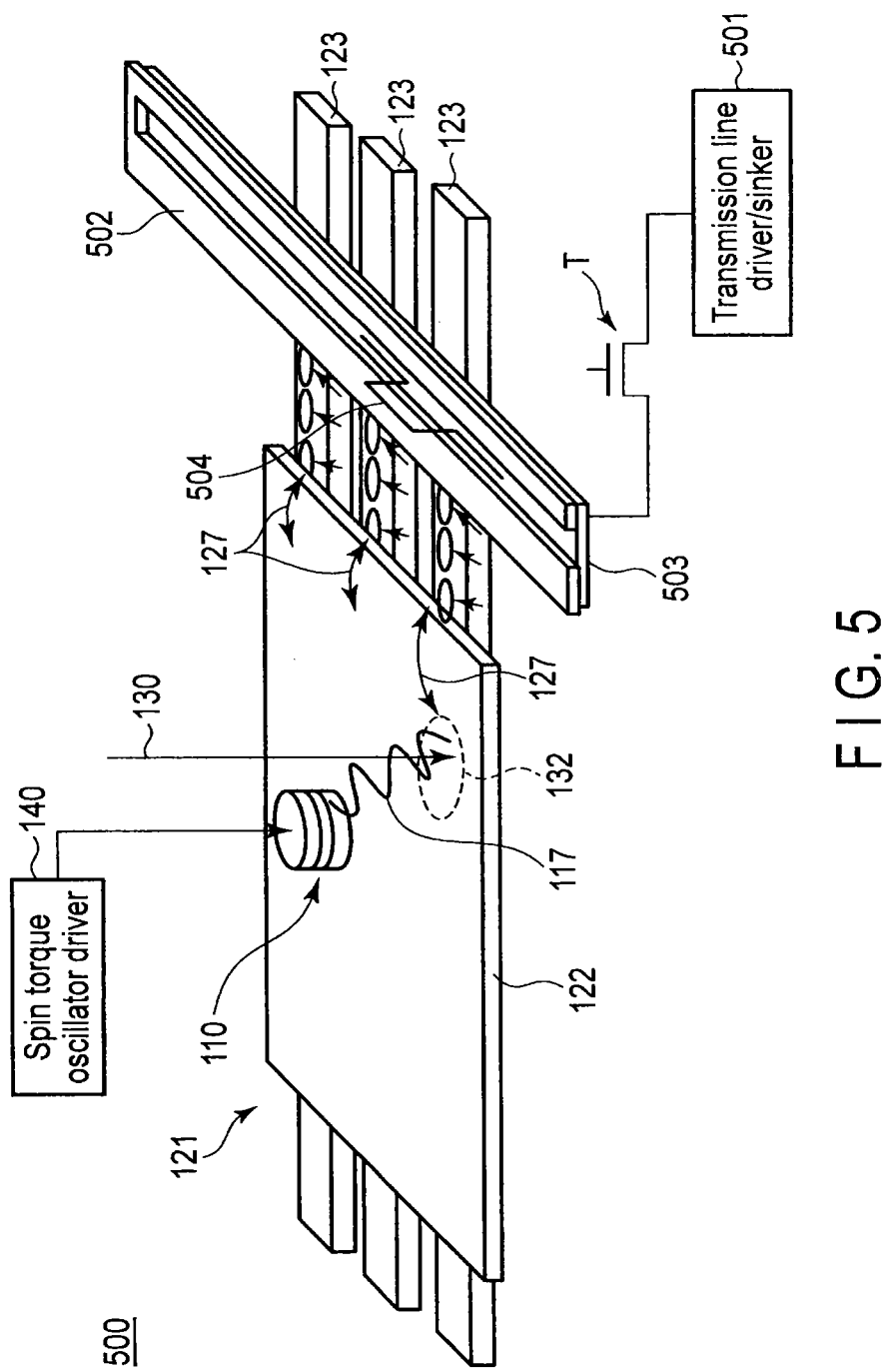
F I G. 5

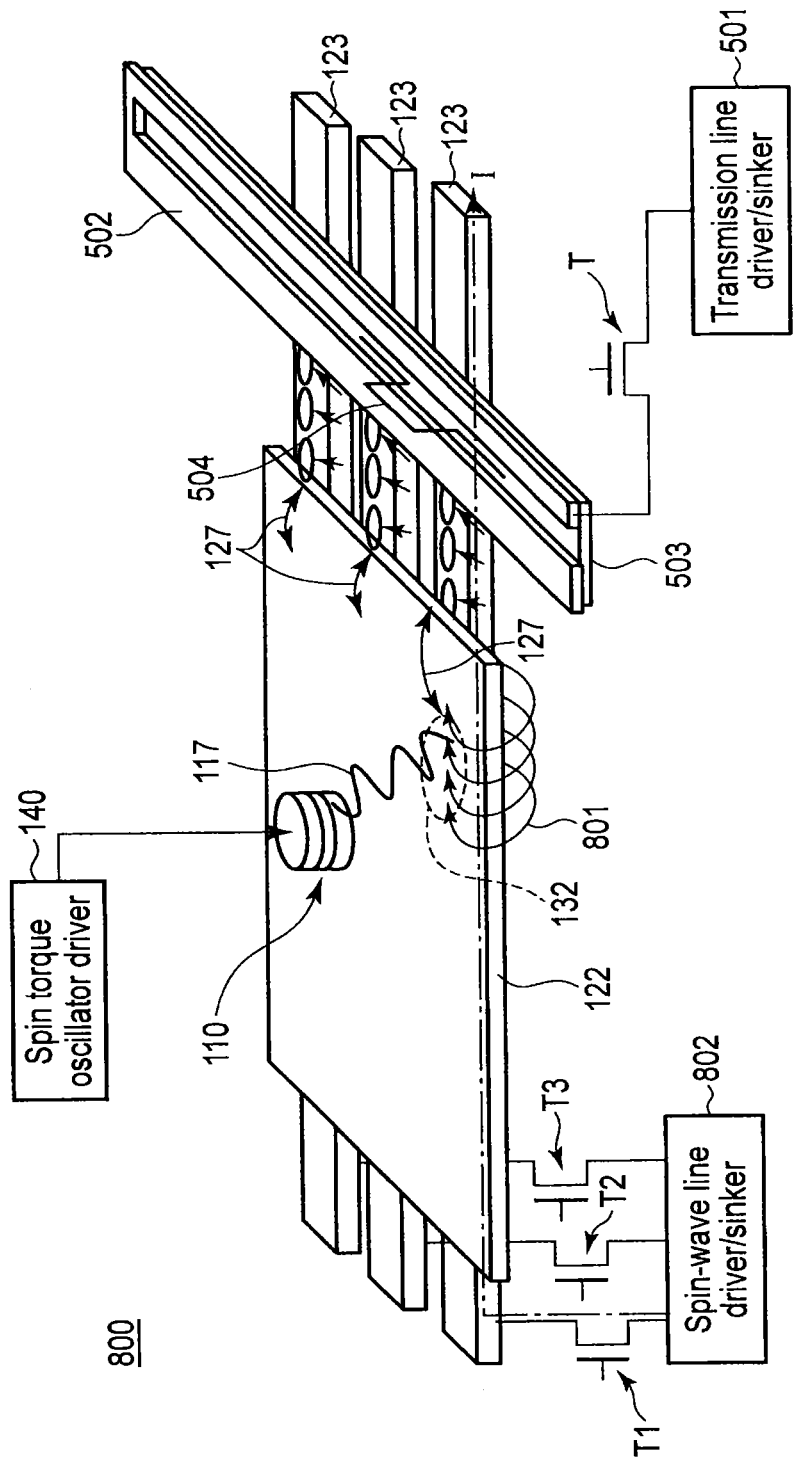
F I G. 8

MAGNETIC RECORDING APPARATUS

CROSS-REFERENCE TO RELATED APPLICATIONS

This application is based upon and claims the benefit of priority from Japanese Patent Application No. 2013-193469, filed Sep. 18, 2013, the entire contents of which are incorporated herein by reference.

FIELD

Embodiments described herein relate generally to a magnetic recording apparatus employing a microwave assisted magnetic recording.

BACKGROUND

As large-volume contents spread, demands have arisen for increasing the capacity of a magnetic recording apparatus such as a hard disk drive (HDD). Since the existing perpendicular magnetic recording method cannot unlimitedly increase the capacity, a recording method capable of further increasing the capacity is being searched for. With this background, research and development have taken place on a recording method called "microwave assisted magnetic recording," which utilizes a magnetic resonance phenomenon in which a magnetic material resonates with a specific frequency. Also, a multilayer recording technique which increases the capacity of a magnetic recording apparatus by multilayering a recording medium has been proposed.

A magnetic recording apparatus uses a perpendicular magnetic recording medium having a large magnetic anisotropy constant Ku in order to prevent medium magnetization reversal due to thermal fluctuation. To reverse the medium magnetization of a perpendicular magnetic recording medium having a large magnetic anisotropy constant Ku, it is normally necessary to apply a high write magnetic field. The microwave assisted recording method involves resonating a magnetic recording medium by applying an oscillating magnetic field (also referred to as a microwave magnetic field) near the resonance frequency of the magnetic recording medium, thereby making a desired medium magnetization in the magnetic recording medium readily reversible, and performing magnetic recording. This makes it possible to reduce the magnitude of a write magnetic field.

In the research and development of the microwave assisted magnetic recording technique, a device using a spin torque oscillator is attracting attention as a microwave source for generating a microwave magnetic field. The spin torque oscillator is formed by a magnetic multilayer film similar to a GMR (Giant MagnetoResistance effect) element or TMR (Tunnel MagnetoResistance effect) element. More specifically, the spin torque oscillator has a basic structure including an oscillation layer in which magnetization can rotate, a pinned layer in which magnetization is fixed, and a spacer layer arranged between the oscillation layer and the pinned layer. In the spin torque oscillator, magnetization in the oscillation layer stationarily oscillates due to the spin transfer effect between the oscillation layer and the pinned layer. An oscillating magnetic field having a frequency of a few GHz to a few ten GHz deriving from this magnetization oscillation is generated near the spin torque oscillator. To extract an oscillating magnetic field having a large amplitude suitable for the microwave assisted recording technique from the spin torque oscillator, it is necessary to increase the thickness of the oscillation layer of the spin torque oscillator. However, the spin transfer effect is nonuniform in the thickness direction, and this makes it difficult to uniformly oscillate the oscillation layer having a large thickness.

The magnetic recording apparatus employing the microwave assisted magnetic recording is required to be able to apply a strong oscillating magnetic field in a write operation, in order to increase the microwave assisting effect.

BRIEF DESCRIPTION OF THE DRAWINGS

FIG. 1 is a sectional view schematically showing a magnetic recording apparatus according to the first embodiment;

FIG. 2 is a perspective view schematically showing the magnetic recording apparatus according to the first embodiment;

FIG. 4A is a sectional view schematically showing an example of a spin torque oscillator portion shown in FIG. 3;

FIG. 4B is a sectional view schematically showing another example of the spin torque oscillator portion shown in FIG. 3;

FIG. 5 is a perspective view schematically showing a part of a magnetic recording apparatus according to the third embodiment;

FIG. 8 is a perspective view schematically showing another example of the magnetic recording apparatus according to the fifth embodiment;

DETAILED DESCRIPTION

Figure 3:
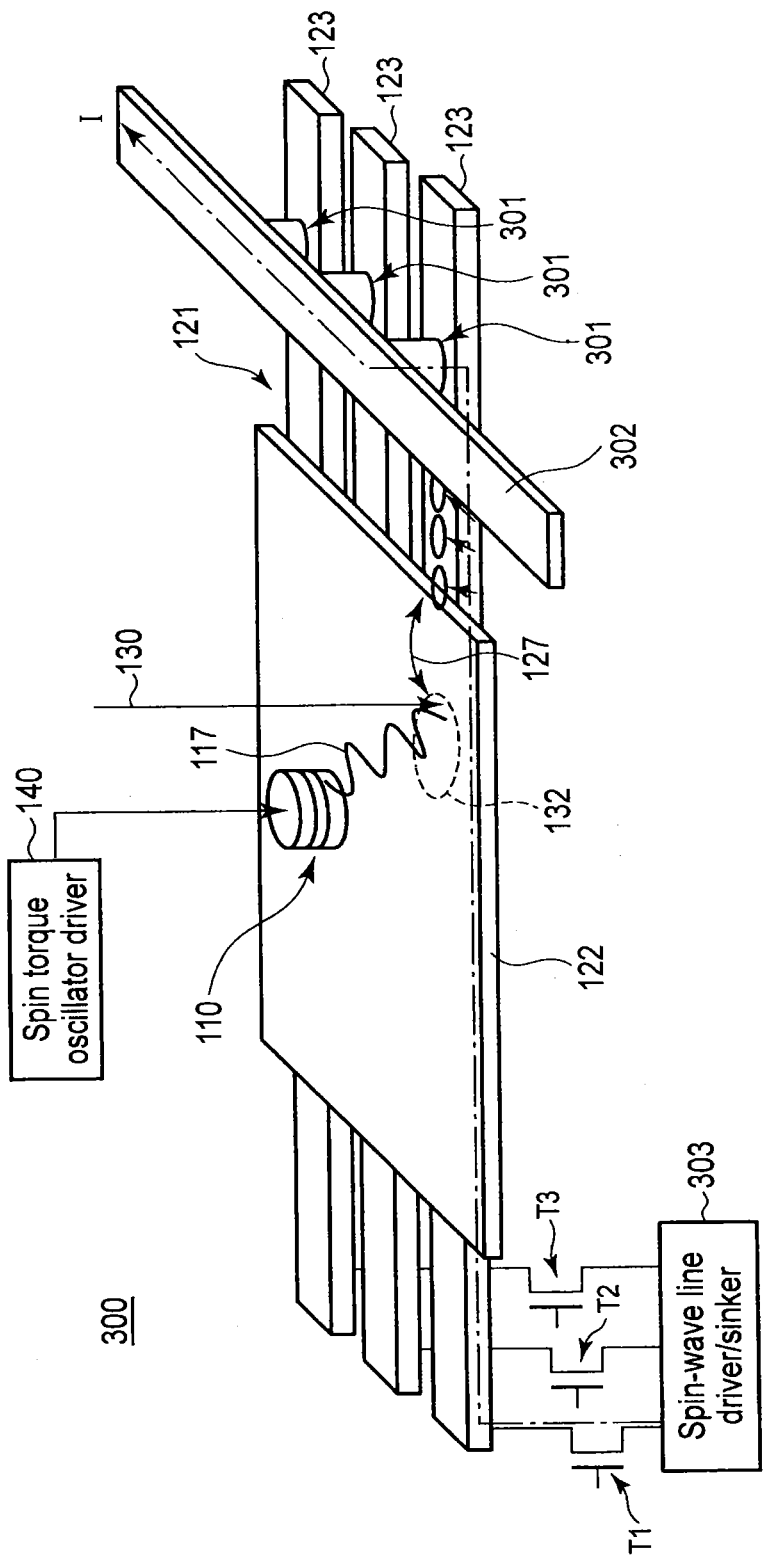
FIG. 3 is a perspective view schematically showing a magnetic recording apparatus according to the second embodiment.

According to an embodiment, a magnetic recording apparatus includes a spin torque oscillator, a recording medium unit, a write magnetic field source, and a controller. The spin torque oscillator generates a first oscillating magnetic field. The recording medium unit includes one or more recording medium layers which are stacked, each of the one or more recording medium layers including a recording medium and a plurality of spin-wave lines which are provided opposite the recording medium and each of which generates a second oscillating magnetic field. The write magnetic field source generates a write magnetic field. The controller is configured to control the spin torque oscillator, the plurality of spin-wave lines, and the write magnetic field source to simultaneously apply the write magnetic field, the first oscillating magnetic field, and the second oscillating magnetic field to target medium magnetization in the recording medium on which data is to be recorded.

Hereinafter, various embodiments will be described with reference to the accompanying drawings. In the following embodiments, like reference numerals denote like elements, and a repetitive explanation will be omitted.

First Embodiment

FIG. 1 is a sectional view schematically showing a magnetic recording apparatus 100 according to the first embodiment. FIG. 2 is a perspective view showing a part of the magnetic recording apparatus 100. As shown in FIG. 1, the magnetic recording apparatus 100 includes a spin torque oscillator 110 and a recording medium unit 120.

The spin torque oscillator 110 includes a magnetic multilayer film 115. The magnetic multilayer film 115 includes a first magnetic layer 111, a spacer layer 112 stacked on the first magnetic layer 111, and a second magnetic layer 113 stacked on the spacer layer 112. For example, the first magnetic layer 111 is a free layer (also referred to as an oscillation layer) in which magnetization can rotate, and the second magnetic layer 113 is a pinned layer in which magnetization is fixed. The first and second magnetic layers 111 and 113 are made of a metal ferromagnetic material, and are in-plane magnetization films. Examples of the metal ferromagnetic material are Ni (nickel), Co (cobalt), Fe (iron), and an alloy (e.g., FeNi (permalloy), CoFe, or CoFeB) containing at least one of Ni, Co, and Fe. The spacer layer 112 may be made of a nonmagnetic metal such as Cu (copper), Ag (silver), or Ru (ruthenium), or may be made of an insulating material such as MgO (magnesium oxide) or AlO (aluminum oxide).

Note that the spin torque oscillator 110 is not limited to the above-described examples, and may be a spin torque oscillator of any form. For example, both the first and second magnetic layers 111 and 113 may be free layers. Also, one or both the first and second magnetic layers 111 and 113 may be perpendicular magnetization films. The first and second magnetic layers 111 and 113 may be formed by a magnetic multilayer film including a ferromagnetic layer.

The spin torque oscillator 110 further includes a pair of electrodes (not shown) for supplying an electric current to the magnetic multilayer film 115 in, e.g., a direction perpendicular to the film plane of the magnetic multilayer film 115. In this embodiment, the film plane corresponds to a plane perpendicular to the direction in which the first magnetic layer 111, spacer layer 112, and second magnetic layer 113 are stacked. When a direct current is supplied to the magnetic multilayer film 115, the spin torque oscillator 110 generates an oscillating magnetic field 117. This direct current has a current density higher than a threshold current density.

When a direct current is supplied to the spin torque oscillator 110, magnetization 114 in the first magnetic layer 111 stationarily oscillates due to the spin transfer effect between the first and second magnetic layers 111 and 113. More specifically, the electrons' spins in the direct current are polarized by magnetization in the second magnetic layer 113, and the spin-polarized direct current acts on the magnetization 114 in the first magnetic layer 111, thereby inducing the precession of the magnetization 114. The second magnetic layer 113 is also referred to as a polarizer layer because the second magnetic layer 113 polarizes the electrons' spins in the direct current.

The oscillation frequency of the spin torque oscillator 110 corresponds to the oscillation frequency of the magnetization 114 in the first magnetic layer 111, and depends on, e.g., the material, size, and thickness of the first magnetic layer 111, the magnitude of an external magnetic field which acts on the magnetization 114, and the magnitude of a direct current to be applied to the magnetic multilayer film 115. By properly adjusting these factors, the oscillation frequency of the spin torque oscillator 110 can be set at an arbitrary value from a few GHz to a few ten GHz. As the magnetization 114 oscillates, the oscillating magnetic field 117 having a frequency (a few GHz to a few ten GHz) corresponding to the oscillation frequency of the spin torque oscillator 110 is generated near it. This oscillating magnetic field is also referred to as a high-frequency magnetic field or microwave magnetic field.

The magnetic recording apparatus 100 further includes a spin torque oscillator driver 140 for operating the spin torque oscillator 110. For example, the spin torque oscillator driver 140 controls an electric current to be supplied to the spin torque oscillator 110 in order to generate the oscillating magnetic field 117. The spin torque oscillator driver 140 can also control the position of the spin torque oscillator 110. The spin torque oscillator driver 140 functions as a part of a recording controller for controlling the process of magnetic recording. In addition to the spin torque oscillator driver 140, the recording controller includes a driver for operating spin-wave lines 123 (e.g., a spin-wave line driver/sinker 303 shown in FIG. 3, or a transmission line driver/sinker 501 shown in FIG. 5), and a driver for operating a write magnetic field source (e.g., a spin-wave line driver/sinker 802 shown in FIG. 8 or a controller shown in FIG. 9).

The recording medium unit 120 includes one or more recording medium layers 121. In the example shown in FIG. 1, three recording medium layers, 121A, 121B, and 121C, are stacked. Since the recording medium layers 121A, 121B, and 121C have the same structure, letters (A, B, and C) attached to the reference numerals will be omitted in the following explanation except when it is necessary to distinguish between the individual recording medium layers. FIG. 2 shows one recording medium layer 121 (e.g., the recording medium layer 121A), and does not show other recording medium layers 121 (e.g., the recording medium layers 121B and 121C).

As shown in FIG. 2, the recording medium layer 121 includes a recording medium 122, and a plurality of spin-wave lines 123 arranged opposite the recording medium 122. In this embodiment, the plurality of spin-wave lines 123 are provided parallel at equal intervals. Assuming that the side of the spin torque oscillator 110 is "up" and the side of the recording medium unit 120 is "down", the vertical direction is defined along the stacking direction in which the magnetic medium layers 121A, 121B, and 121C are stacked. The stacking direction corresponds to the direction perpendicular to a magnetic film of the recording medium 122. The spin-wave lines 123 need not always be arranged opposite the lower surface of the recording medium 122 as shown in FIG. 2, and may be arranged opposite the upper surface of the recording medium 122.

The spin-wave line 123 generates an oscillating magnetic field 127 when operated by a spin-wave generating element not shown in FIGS. 1 and 2. More specifically, the spin-wave generating element excites a spin wave in the spin-wave line 123, and the oscillating magnetic field 127 having a frequency corresponding to the frequency of the excited spin wave is generated near it. Practical methods of exciting a spin wave in the spin-wave line 123 will be explained in the second to fourth embodiments.

The recording medium 122 includes a plurality of recording bits. As an example, a plurality of tracks are formed on the recording medium 122 in one-to-one correspondence with the plurality of spin-wave lines 123, and recording bits are arranged at equal intervals in each track. The recording medium 122 of this embodiment is a perpendicular magnetic recording medium in which the magnetization direction is perpendicular to the magnetic film. The magnetization direction of a recording bit corresponds to data recorded in the recording bit. For example, the magnetization direction of a recording bit holding data "0" is upward, and the magnetization direction of a recording bit holding data "1" is downward. The magnetization of a recording bit will also be referred to as medium magnetization hereinafter. Note that the recording medium 122 is not limited to a perpendicular magnetic recording medium, and may be an in-plane magnetic recording medium in which the magnetization direction is parallel to the magnetic film.

Recording media 122A, 122B, and 122C have different magnetic resonance frequencies $f_A$, $f_B$, and $f_C$. As an example, these magnetic resonance frequencies are so set as to decrease toward the recording medium 122 closest to the spin torque oscillator 110, i.e., set such that $f_A < f_B < f_C$.

Note that the shape of the recording medium 122 is not limited to a rectangular shape as shown in FIG. 2, and can be any shape. For example, the recording medium 122 can have a circular disk shape like that of the conventional HDD. In this case, a plurality of annular tracks are formed on the recording medium 122 along the radius direction from the center of the recording medium 122, and a plurality of annular spin-wave lines are provided opposite the recording medium 122.

When writing data to the recording medium 122 in the magnetic recording apparatus 100, a write magnetic field (also referred to as a recording magnetic field) 130 is applied to the recording medium 122, and the spin torque oscillator 110 and the spin-wave line 123 are operated. "The spin torque oscillator 110 is operated" means that the spin torque oscillator 110 is oscillated by supplying a direct current to it. When operated, the spin torque oscillator 110 generates the oscillating magnetic field 117. Also, "the spin-wave line 123 is operated" means that the spin-wave line 123 is caused to excite a spin wave. When operated, the spin-wave line 123 generates the oscillating magnetic field 127.

In the recording medium 122, the microwave assisted magnetic recording technique is applied to a portion 132 where the oscillating magnetic fields 117 and 127 superpose each other. That is, in the portion 132 where the oscillating magnetic fields 117 and 127 superpose each other, an oscillating magnetic field stronger than those in other portions is applied, and the oscillating magnetic fields 117 and 127 assist the reversal of medium magnetization by the write magnetic field 130.

In this embodiment, the medium magnetization has a coercive force by which the magnetization does not reverse by only the write magnetic field 130, so that the medium magnetization positioned in the superposing portion 132 of the two oscillating magnetic fields 117 and 127 locally reverses. Furthermore, the microwave assisting effect does not appear by only one of the oscillating magnetic field 117 from the spin torque oscillator 110 and the oscillating magnetic field 127 from the spin-wave line 123. The magnetic recording apparatus 100 of this embodiment includes two oscillating magnetic field sources (also referred to as assist sources), i.e., the spin torque oscillator 110 and the spin-wave line 123, and the oscillating magnetic fields from these oscillating magnetic field sources are simultaneously (superposedly) applied. This makes it possible to apply a strong oscillating magnetic field to a target medium magnetization on which data is to be recorded. Accordingly, a high microwave assisting effect is obtained.

Next, an operation of writing data to a recording bit 125B of the recording medium layer 121B shown in FIG. 1 will be explained as a practical example. A recording bit (in this example, the recording bit 125B) to which data is to be written will be called a target recording bit. In this write operation, the write magnetic field 130 is applied to the target recording bit 125B, and the spin torque oscillator 110 and at least one of the plurality of spin-wave lines 123B corresponding to the recording medium 122B are operated. The spin torque oscillator 110 moves relative to the recording medium unit 120 so that the target recording bit 125B is positioned in the portion 132 where the oscillating magnetic field 117 from the spin torque oscillator 110 and the oscillating magnetic field 127 from the spin-wave line 123B superpose each other. More specifically, the spin torque oscillator 110 moves to be positioned above the target recording bit 125B. Thus, the write magnetic field 130, the oscillating magnetic field 117 from the spin torque oscillator 110, and the oscillating magnetic field 127 from the spin-wave line 123B are applied to the target recording bit 125B. Consequently, the magnetization of the target recording bit 125B can selectively be reversed. The direction of the write magnetic field 130 is determined in accordance with write data. For example, the direction of the write magnetic field 130 is set upward when writing data "0", and set downward when writing data "1".

To efficiently use the microwave assisting effect, it is desirable to set the frequencies of the oscillating magnetic fields 117 and 127 near the magnetic resonance frequency of the recording medium 122 to which data is to be written. For example, when the frequencies of the oscillating magnetic fields 117 and 127 are set near the magnetic resonance frequency $f_B$ of the recording medium 122B, magnetic resonance occurs between the target recording bit 125B and the oscillating magnetic fields 117 and 127. This facilitates reversing the magnetization of the target recording bit 125B.

As described above, in the magnetic recording apparatus according to the first embodiment, the oscillating magnetic field from the spin torque oscillator and the oscillating magnetic field from at least one spin-wave line are applied, thereby magnetically resonating the medium magnetization positioned in the portion where these oscillating magnetic fields superpose each other. This facilitates local reversal of the medium magnetization. Data can be written to the medium magnetization by applying the write magnetic field together with these oscillating magnetic fields.

Second Embodiment

In the second embodiment, an example of a method of exciting a spin wave in a spin-wave line will be explained.

FIG. 3 schematically shows a magnetic recording apparatus 300 according to the second embodiment. The magnetic recording apparatus 300 shown in FIG. 3 includes a spin torque oscillator 110, and a recording medium unit 120 in which one or more recording medium layers 121 are stacked. For the sake of simplicity, FIG. 3 shows one recording medium layer 121. Each recording medium layer 121 includes a recording medium 122 and a plurality of (in the example shown in FIG. 3, three) spin-wave lines 123. The plurality of spin-wave lines 123 are arranged parallel with each other and opposite the lower surface of the recording medium 122.

In this embodiment, the spin-wave lines 123 are made of a metal ferromagnetic material such as Ni, Co, Fe, or an alloy containing at least one of Ni, Co, and Fe. Spin torque oscillator portions 301 to generate spin waves are provided at parts of the spin-wave lines 123. The spin-wave lines 123 are electrically connected to a transmission line 302 via the spin torque oscillator portions 301.

Also, the spin-wave lines 123 are connected to a spin-wave line driver/sinker 303 via transistors T1, T2, and T3. The driver/sinker 303 controls an electric current I to be supplied to the spin-wave lines 123. The driver/sinker 303 functions as a part of a recording controller. In a write operation, the spin-wave line 123 is selected by the operations of these transistors. In this embodiment, the recording medium layer 121 includes the recording medium 122, the spin-wave lines 123, the spin torque oscillator portions 301, the transmission line 302, and the transistors T1, T2, and T3.

FIG. 4A is a sectional view showing the first structure example of the spin torque oscillator portion 301, which is one of the spin torque oscillator portions 301. The spin torque oscillator portion 301 shown in FIG. 4A is formed by a part of the spin-wave line 123, a spacer layer 402, and a polarizer layer 401. The transmission line 302 is connected to the polarizer layer 401. When the transistor of a given spin-wave line 123 is turned on, the direct current I flows through the spin torque oscillator portion 301 of the spin-wave line 123. In the example shown in FIG. 3, the transistor T1 is turned on. More specifically, the direct current I flows through the spin-wave line 123, the spin torque oscillator portion 301, and the transmission line 302. The electrons' spins in the direct current I are polarized when passing through the polarizer layer 401. Consequently, magnetization dynamics is excited by spin torque mainly in a portion of the spin-wave line 123, which is immediately below the spacer layer 402, and a spin wave propagates in the spin-wave line 123. In a write operation, the microwave assisting effect appears in a portion 132 where an oscillating magnetic field 127 from the spin wave thus excited and an oscillating magnetic field 117 from the spin torque oscillator 110 superpose each other, and local write is performed to medium magnetization in the recording medium 122. The recording medium layer 121 and the spin-wave line 123 to be operated in the recording medium layer 121 are selected by the transistors, and a write target portion of the recording medium 122 is selected by the spin torque oscillator 110. In other words, a target recording bit is determined by a transistor to be turned on and the position of the spin torque oscillator 110.

FIG. 4B is a sectional view showing the second structure example of the spin torque oscillator portion 301. The spin torque oscillator portion 301 shown in FIG. 4B is formed by an oscillation layer 403 stacked on a part of the spin-wave line 123, a spacer layer 402 stacked on the oscillation layer 403, and a polarizer layer 401 stacked on the spacer layer 402. The transmission line 302 is connected to the polarizer layer 401. When the transistor (in the example shown in FIG. 3, the transistor T1) of a given spin-wave line 123 is turned on, the direct current I flows through the spin torque oscillator portion 301 of the spin-wave line 123. The electrons' spins in the direct current I are polarized when passing through the polarizer layer 401. Consequently, magnetization in the oscillation layer 403 oscillates due to the spin transfer effect between the oscillation layer 403 and the polarizer layer 401. This oscillation of the magnetization in the oscillation layer 403 generates an oscillating magnetic field 404, and the oscillating magnetic field 404 from the oscillation layer 403 acts on the spin-wave line 123. The oscillating magnetic field 404 excites a spin wave mainly in a portion of the spin-wave line 123, which is immediately below the oscillation layer 403, and this spin wave propagates in the spin-wave line 123. In a write operation, the microwave assisting effect appears in a portion 132 where an oscillating magnetic field 127 from the spin wave thus excited and an oscillating magnetic field 117 from the spin torque oscillator 110 superpose each other, and local write is performed to medium magnetization in the recording medium 122. The recording medium layer 121 and the spin-wave line 123 to be operated in the recording medium layer 121 are selected by the transistors, and a write target portion of the recording medium 122 is selected by the spin torque oscillator 110.

As described above, in the magnetic recording apparatus according to the second embodiment, the spin torque oscillator portion is provided at a part of the spin-wave line made of a metal ferromagnetic material. This makes it possible to excite a spin wave in the spin-wave line, and generate an oscillating magnetic field from the spin-wave line.

Third Embodiment

In the third embodiment, another example of the method of exciting a spin wave in a spin-wave line will be explained.

FIG. 5 schematically shows a magnetic recording apparatus 500 according to the third embodiment. As shown in FIG. 5, the magnetic recording apparatus 500 includes a spin torque oscillator 110, and a recording medium unit 120 in which one or more recording medium layers 121 are stacked. For the sake of simplicity, FIG. 5 shows one recording medium layer 121. Each recording medium layer 121 includes a recording medium 122 and a plurality of spin-wave lines 123, and the plurality of spin-wave lines 123 are arranged parallel with each other and opposite the lower surface of the recording medium 122.

In this embodiment, the spin-wave lines 123 are made of a metal ferromagnetic material such as Ni, Co, Fe, or an alloy containing at least one of Ni, Co, and Fe. A transmission line (also referred to as a spin-wave generating line) 502 is provided on parts of the spin-wave lines 123 with an insulating layer 503 interposed between them. FIG. 5 shows an example in which the transmission line 502 is an asymmetric coplanar waveguide line often used in academic experiments on the propagation of a spin wave. The transmission line 502 is connected to a spin-transmission line driver/sinker 501 via a transistor T. The driver/sinker 501 controls an electric current to be supplied to the transmission line 502. The driver/sinker 501 functions as a part of a recording controller. In this embodiment, the recording medium 122, the spin-wave lines 123, the insulating layer 503, the transmission line 502, and the transistor T form the recording medium layer 121.

In a write operation, an electric current flows through the transmission line 502 when the transistor T is turned on, and the transmission line 502 generates a pulse magnetic field 504 corresponding to the ON duration. The pulse magnetic field 504 excites spin waves in all the spin-wave lines 123 connected to the transmission line 502 via the insulating layer 503, and the spin waves propagate in the spin-wave lines 123. The microwave assisting effect appears in a portion 132 where an oscillating magnetic field 127 from the spin wave thus excited and an oscillating magnetic field 117 from the spin torque oscillator 110 superpose each other, and local write is performed to medium magnetization in the recording medium 122. The recording medium layer 121 and the spin-wave lines 123 to be operated in the recording medium layer 121 are selected by the transistor, and a write target portion of the recording medium 122 is selected by the spin torque oscillator 110.

As described above, in the magnetic recording apparatus according to the third embodiment, the transmission line (spin-wave generating line) is provided on parts of the spin-wave lines made of a metal ferromagnetic material with the insulating layer interposed between them. When an electric current is supplied to the transmission line, the transmission line generates a magnetic field, and this magnetic field excites spin waves in the spin-wave lines. Accordingly, the spin-wave lines can generate oscillating magnetic fields. Since the common transmission line is provided for the plurality of spin-wave lines, the number of switches (transistors) for spin-wave generation can be reduced.

Fourth Embodiment

In the fourth embodiment, still another example of the method of exciting a spin wave in a spin-wave line will be explained.

Figure 6:
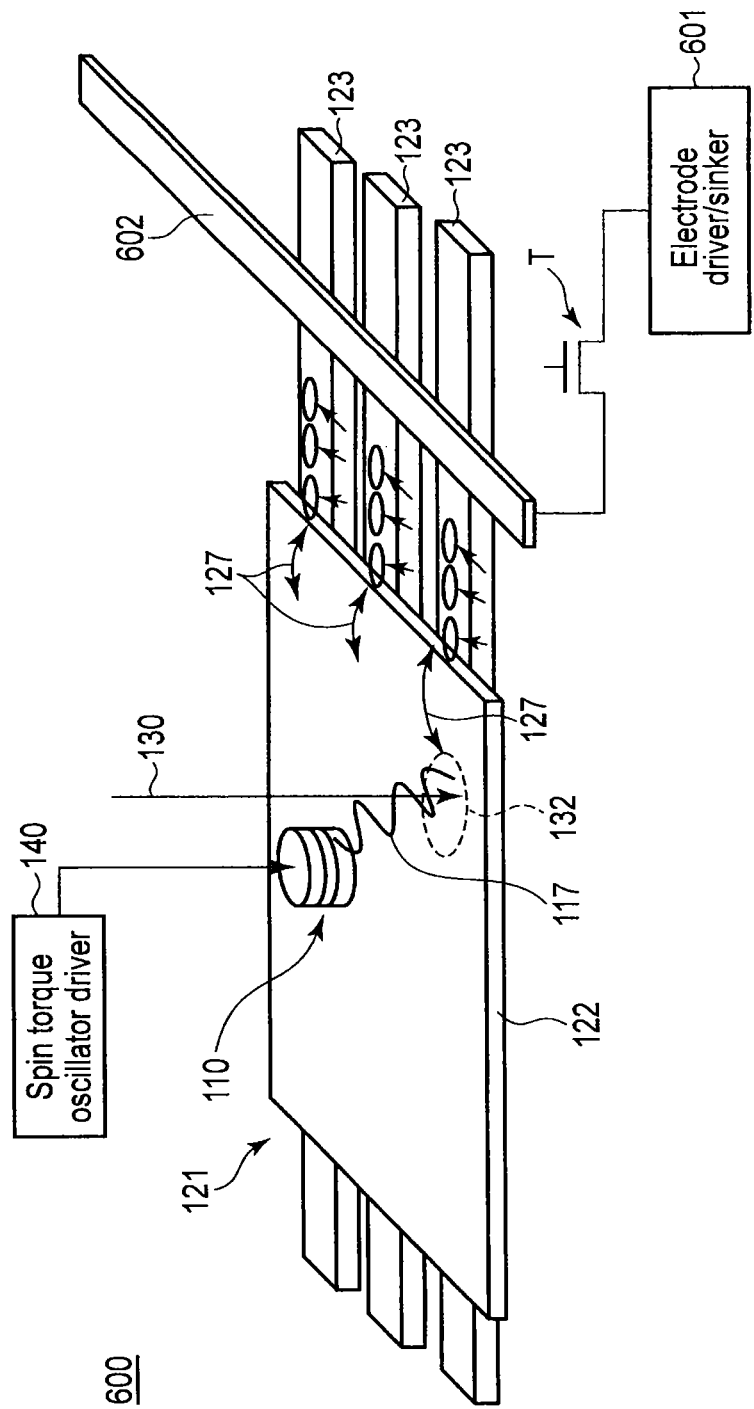
FIG. 6 is a perspective view schematically showing a part of a magnetic recording apparatus according to the fourth embodiment.

FIG. 6 schematically shows a magnetic recording apparatus 600 according to the fourth embodiment. As shown in FIG. 6, the magnetic recording apparatus 600 includes a spin torque oscillator 110, and a recording medium unit 120 in which one or more recording medium layers 121 are stacked. For the sake of simplicity, FIG. 6 shows one recording medium layer 121. In each recording medium layer 121, a plurality of spin-wave lines 123 are arranged parallel with each other and opposite the lower surface of a recording medium 122.

In this embodiment, the spin-wave lines 123 are made of a magnetic insulating material represented by RIG (Rare-earth Iron Garnet) such as YIG (Yttrium Iron Garnet). A spin-wave generating electrode 602 is provided on parts of the spin-wave lines 123. The spin-wave generating electrode 602 is connected to an electrode driver/sinker 601 via a transistor T. The driver/sinker 601 controls an electric current to be supplied to the spin-wave generating electrode 602. The driver/sinker 601 functions as a part of a recording controller. In this embodiment, the recording medium 122, the spin-wave lines 123, the spin-wave generating electrode 602, and the transistor T form the recording medium layer 121. Note that the spin-wave generating electrode 602 is not limited to a linear electrode as shown in FIG. 6, and may be an electrode having another shape, e.g., an asymmetric coplanar waveguide electrode.

In a write operation, the transistor T is turned on, and the spin-wave generating electrode 602 generates a pulse magnetic field corresponding to the ON duration. This pulse magnetic field excites spin waves in all the spin-wave lines 123 in contact with the spin-wave generating electrode 602, and the spin waves propagate in the spin-wave lines 123. When using a metal having a large spin orbit interaction such as Pt (platinum) as the material of the spin-wave generating electrode 602, the spin Hall effect occurs when an electric current is supplied, and a pure spin current arises perpendicularly to the electric current in the electrode 602. This pure spin current induces the precession of magnetization in the spin-wave line 123 due to the spin transfer effect. Consequently, a spin wave is excited in the spin-wave line 123 and propagates in it. The microwave assisting effect appears in a portion 132 where an oscillating magnetic field 127 from the spin wave thus excited and an oscillating magnetic field 117 from the spin torque oscillator 110 superpose each other, and local write is performed to medium magnetization in the recording medium 122. The recording medium layer 121 and the spin-wave line 123 to be operated in the recording medium layer 121 are selected by the transistor, and a write target portion of the recording medium 122 is selected by the spin torque oscillator 110.

As described above, in the magnetic recording apparatus according to the fourth embodiment, the electrode is provided on parts of the spin-wave lines made of a magnetic insulating material. When an electric current is supplied to the electrode, a spin wave is excited in the spin-wave line. Accordingly, the spin-wave line can generate an oscillating magnetic field. Since the spin-wave line is made of an insulating material, an insulator for electrically isolating the recording medium and spin-wave line is not always necessary. This makes it possible to simplify the layer structure of the recording medium layer.

Fifth Embodiment

In the fifth and sixth embodiments, a write magnetic field source for generating a write magnetic field will be explained. In the fifth embodiment, an example in which a spin-wave line functions as both an oscillating magnetic field source and write magnetic field source will be explained.

Figure 7:
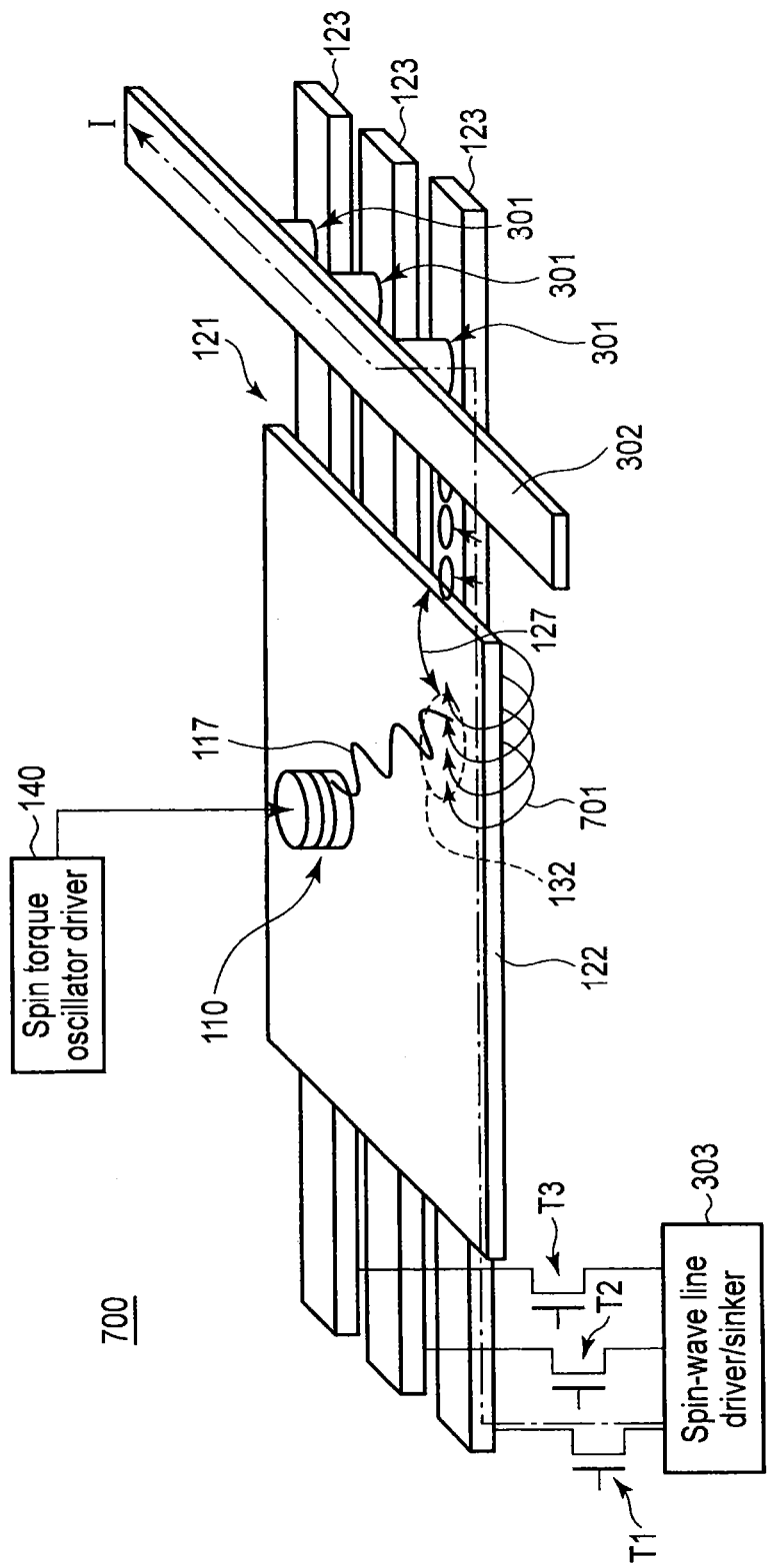
FIG. 7 is a perspective view schematically showing an example of a magnetic recording apparatus according to the fifth embodiment.

FIG. 7 schematically shows a magnetic recording apparatus 700 according to the first example of the fifth embodiment. The magnetic recording apparatus 700 shown in FIG. 7 has the same arrangement as that of the magnetic recording apparatus 300 (FIG. 3) explained in the second embodiment, so a repetitive explanation of the second embodiment will be omitted.

Spin-wave lines 123 of the magnetic recording apparatus 700 are made of a metal ferromagnetic material such as Ni, Co, Fe, or an alloy containing at least one of Ni, Co, and Fe. When a direct current I is supplied to each spin-wave line 123, a current magnetic field 701 following from the Biot-Savart law is generated around the spin-wave line 123. The generated current magnetic field 701 acts on a recording medium 122. In the magnetic recording apparatus 700, the current magnetic field 701 is used as a write magnetic field (the write magnetic field 130 shown in, e.g., FIG. 1). The direction of the current magnetic field 701 can be controlled by the direction of the direct current I.

In a write operation, a transistor of a given spin-wave line 123 is turned on. FIG. 7 shows a state in which a transistor T1 is turned on. Consequently, the direct current I flows through a spin torque oscillator portion 301 of the spin-wave line 123, and a spin wave is excited in the spin-wave line 123 as described previously. In addition, the direct current I generates the current magnetic field 701, and the current magnetic field 701 acts as a write magnetic field on the recording medium 122. That is, an oscillating magnetic field 127 and the current magnetic field 701, which are generated by the spin-wave line 123, act on the recording medium 122. When an oscillating magnetic field 117 from a spin torque oscillator 110 acts on the recording medium 122 in this state, a portion 132 where the oscillating magnetic fields 117 and 127 superpose each other forms, and the microwave assisting effect locally appears in the portion 132, thereby writing data to a recording bit in the recording medium 122.

FIG. 8 schematically shows a magnetic recording apparatus 800 according to the second example of the fifth embodiment. In FIG. 8, the same reference numerals as in FIG. 5 denote the same parts and the same portions, and an explanation thereof will be omitted.

In the magnetic recording apparatus 800 shown in FIG. 8, a power supply and a switch for supplying the electric current I are provided at the end part of the spin-wave line 123. A spin-wave line driver/sinker 802 controls the magnitude of the electric current I. The driver/sinker 802 functions as a part of a recording controller. When a transistor (e.g., the transistor T1) is turned on, the electric current I flows through a corresponding spin-wave line 123, and a current magnetic field 801 following from the Biot-Savart law is generated around the spin-wave line 123. The current magnetic field 801 acts on the recording medium 122. In the magnetic recording apparatus 800, the current magnetic field 801 is used as a write magnetic field.

In a write operation, the spin torque oscillator 110 and a spin-wave line 123 are operated, and the transistor (e.g., the transistor T1) of the spin-wave line 123 corresponding to a target recording bit is operated, i.e., turned on. Consequently, the oscillating magnetic field 117 from the spin torque oscillator 110, the oscillating magnetic field 127 from the spin-wave line 123, and the current magnetic field 801 as a write magnetic field simultaneously act on the portion 132 of the recording medium 122, and microwave assisted recording is locally performed on the recording bit positioned in the portion 132.

As described above, in the magnetic recording apparatus according to the fifth embodiment, the current magnetic field generated by supplying an electric current to the spin-wave line can be used as a write magnetic field. This obviates the need to additionally form a write magnetic field source.

Sixth Embodiment

In the sixth embodiment, an example in which a write magnetic field source is prepared as a separate element will be explained.

Figure 9:
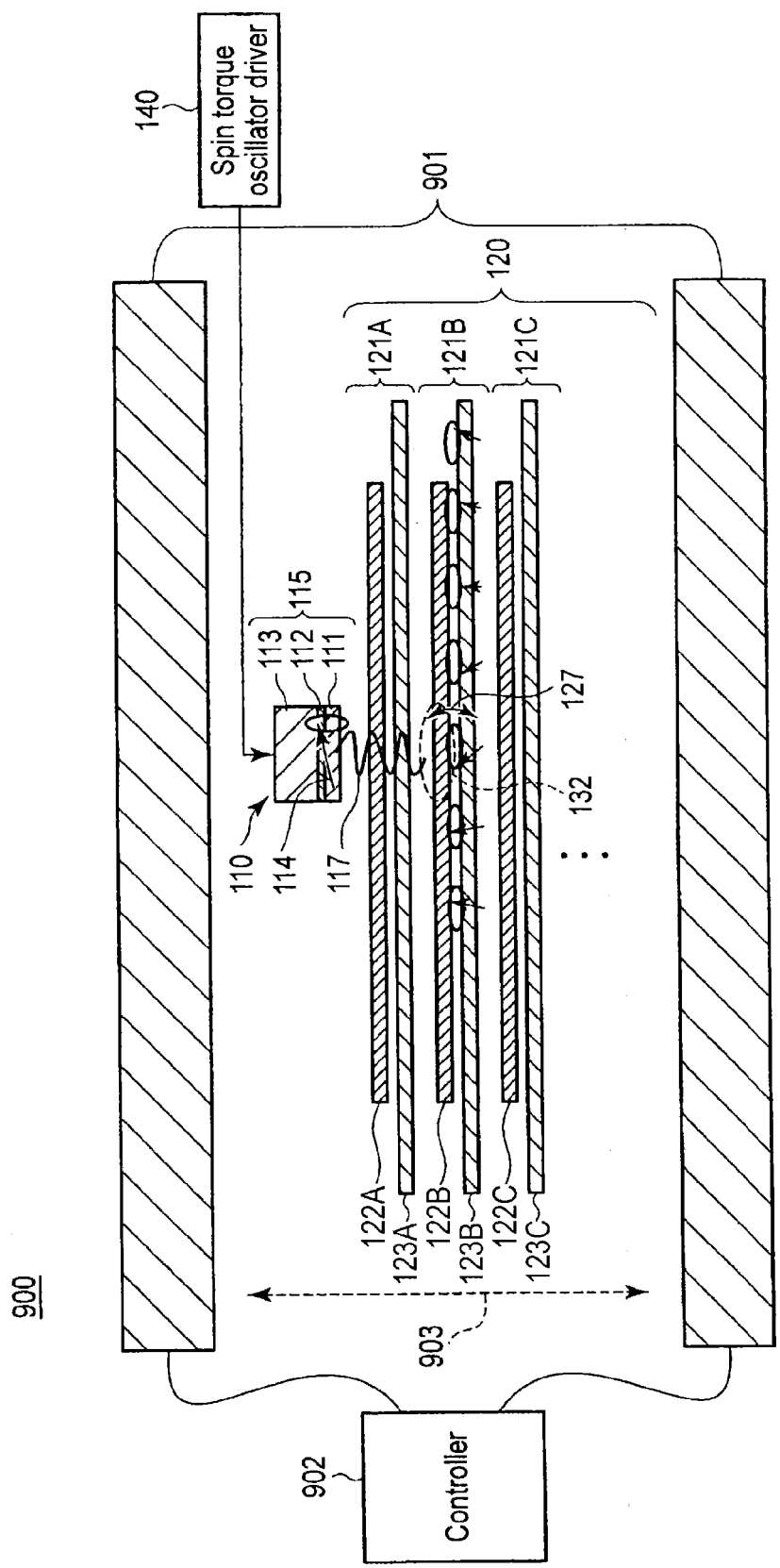
FIG. 9 is a sectional view schematically showing a magnetic recording apparatus according to the sixth embodiment.

FIG. 9 schematically shows a magnetic recording apparatus 900 according to the sixth embodiment. As shown in FIG. 9, the magnetic recording apparatus 900 includes a spin torque oscillator 110, a recording medium unit 120, a polarity-variable magnet 901 corresponding to a write magnetic field source, and a controller 902 for controlling the polarity of the magnet 901. The controller 902 functions as a part of a recording controller. The recording medium unit 120 includes one or more recording medium layers 121, and each recording medium layer 121 includes a recording medium 122 and a plurality of spin-wave lines 123 arranged opposite the lower surface of the recording medium 122. The structure including the spin torque oscillator 110 and recording medium unit 120 is arranged under a magnetic field 903 generated by the magnet 901. That is, the magnetic field 903 from the magnet 901 acts on the whole recording medium 122. The magnetic field 903 is used as a write magnetic field.

The controller 902 controls the polarity of the magnet 901 so as to generate the magnetic field 903 in a direction corresponding to data to be written. The recording medium 122 of this embodiment is a perpendicular magnetic recording medium. When reversing the direction of medium magnetization from downward to upward (e.g., when writing data "0"), the controller 902 controls the polarity of the magnet 901 so that the direction of the magnetic field 903 is upward. On the other hand, when reversing the medium magnetization direction from upward to downward (e.g., when writing data "1"), the controller 902 controls the polarity of the magnet 901 so that the direction of the magnetic field 903 is downward. The operation of the controller 902 is synchronized with a driver for operating the spin torque oscillator 110 (e.g., the spin torque oscillator driver 140 shown in FIG. 1) and a driver for operating the spin-wave lines 123 (e.g., the spin-wave line driver/sinker 303 shown in FIG. 3).

When writing data to the recording medium 122 (e.g., a recording medium 122B) in the magnetic recording apparatus 900, the spin torque oscillator 110 and the corresponding spin-wave line 123 (e.g., a spin-wave line 123B) are operated while the magnetic field 903 generated by the magnet 901 is applied. When the spin torque oscillator 110 is operated, an oscillating magnetic field 117 is generated near the spin torque oscillator 110. When the spin-wave line 123B is operated, an oscillating magnetic field 127 is generated near the spin-wave line 123B. In the recording medium 122, the microwave assisted recording technique is applied to medium magnetization positioned in a portion 132 where the oscillating magnetic fields 117 and 127 superpose each other. In the portion 132 where the oscillating magnetic fields 117 and 127 superpose each other, an oscillating magnetic field stronger than those in other portions is applied, and the oscillating magnetic fields 117 and 127 assist the reversal of medium magnetization by the magnetic field 903.

Note that the magnetic field 903 from the magnet 901 globally acts on the recording medium 122, so the apparatus can also be designed to globally erase recorded data by using the magnetic field 903 from the magnet 901. In this case, two levels, i.e., levels 1 and 2 are prepared as the magnitude of the magnetic field 903 generated from the magnet 901. Level 1 indicates the magnitude of the magnetic field 903 when it is used as a write magnetic field, level 2 indicates the magnitude of the magnetic field 903 when it is used in global erase, and level 1 is smaller than level 2. That is, the magnitude of a magnetic field on level 1 cannot reverse the medium magnetization in the recording medium 122 without the microwave assisting effect, and the magnitude of a magnetic field on level 2 can reverse the medium magnetization in the recording medium 122 without the microwave assisting effect.

Next, practical examples of the polarity-variable magnet 901 shown in FIG. 9 will be explained.

Figure 10:
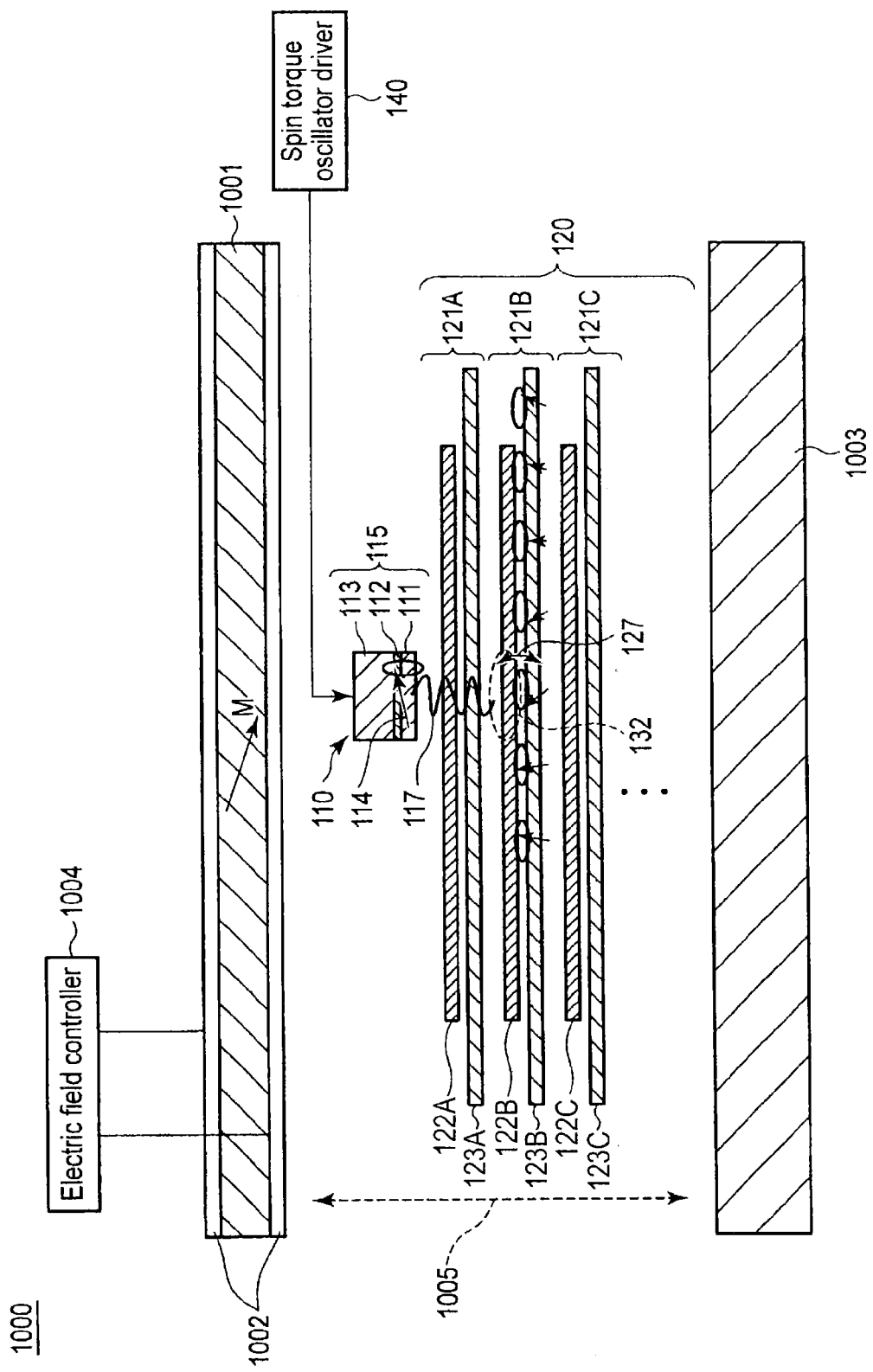
FIG. 10 is a sectional view schematically showing an example of a polarity-variable magnet shown in FIG. 9.

FIG. 10 schematically shows a magnetic recording apparatus 1000 according to the first example of the sixth embodiment. As shown in FIG. 10, the magnetic recording apparatus 1000 includes a spin torque oscillator 110, a recording medium unit 120, a multiferroics material film 1001, a pair of electric field generating films 1002, a soft magnetic material film 1003, and an electric field controller 1004. In the first example, the multiferroics material film 1001, the pair of electric field generating films 1002, and the soft magnetic material film 1003 implement a polarity-variable magnet.

The multiferroics material film 1001 is provided between the pair of electric field generating films 1002, and the pair of electric field generating films 1002 generate an electric field to be applied to the multiferroics material film 1001. The electric field controller 1004 controls the electric field to be applied to the multiferroics material film 1001. The structure including the spin torque oscillator 110 and recording medium unit 120 is arranged between the multiferroics material film 1001 and the soft magnetic material film 1003.

A multiferroics material is a material having both ferromagnetism and ferroelectricity. For example, dysprosium terbium ferrite is known as an insulating oxide magnet whose polarity can be changed by applying an electric field. The multiferroics material film 1001 is made of the multiferroics material. When an electric field is applied to the multiferroics material film 1001, a magnetic moment M of the multiferroics material film 1001 changes. The soft magnetic material film 1003 is made of a material having a large magnetic permeability such as permalloy, and achieves the same function as that of an SUL (Soft magnetic Under Layer) adopted in the perpendicular magnetic recording method of an HDD. In this example, the soft magnetic material film 1003 so functions as to strongly draw in lines of magnetic force generated by the magnetic moment M of the multiferroics material film 1001.

This facilitates applying a magnetic field 1005 to the structure including the spin torque oscillator 110 and recording medium unit 120.

In the example shown in FIG. 10, the recording medium 122 is a perpendicular magnetic recording medium. When reversing the direction of medium magnetization from downward to upward, the electric field controller 1004 controls the electric field generated by the electric field generating films 1002 such that the direction of the magnetic moment M of the multiferroics material film 1001 is upward (accordingly, the direction of the magnetic field 1005 generated by the magnetic moment M is upward). Also, when reversing the direction of medium magnetization from upward to downward, the electric field controller 1004 controls the electric field generated by the electric field generating films 1002 such that the direction of the magnetic moment M of the multiferroics material film 1001 is downward (accordingly, the direction of the magnetic field 1005 generated by the magnetic moment M is downward). The operation of the electric field controller 1004 is synchronized with a driver for operating the spin torque oscillator 110 and a driver for operating the spin-wave lines 123.

Figure 11:
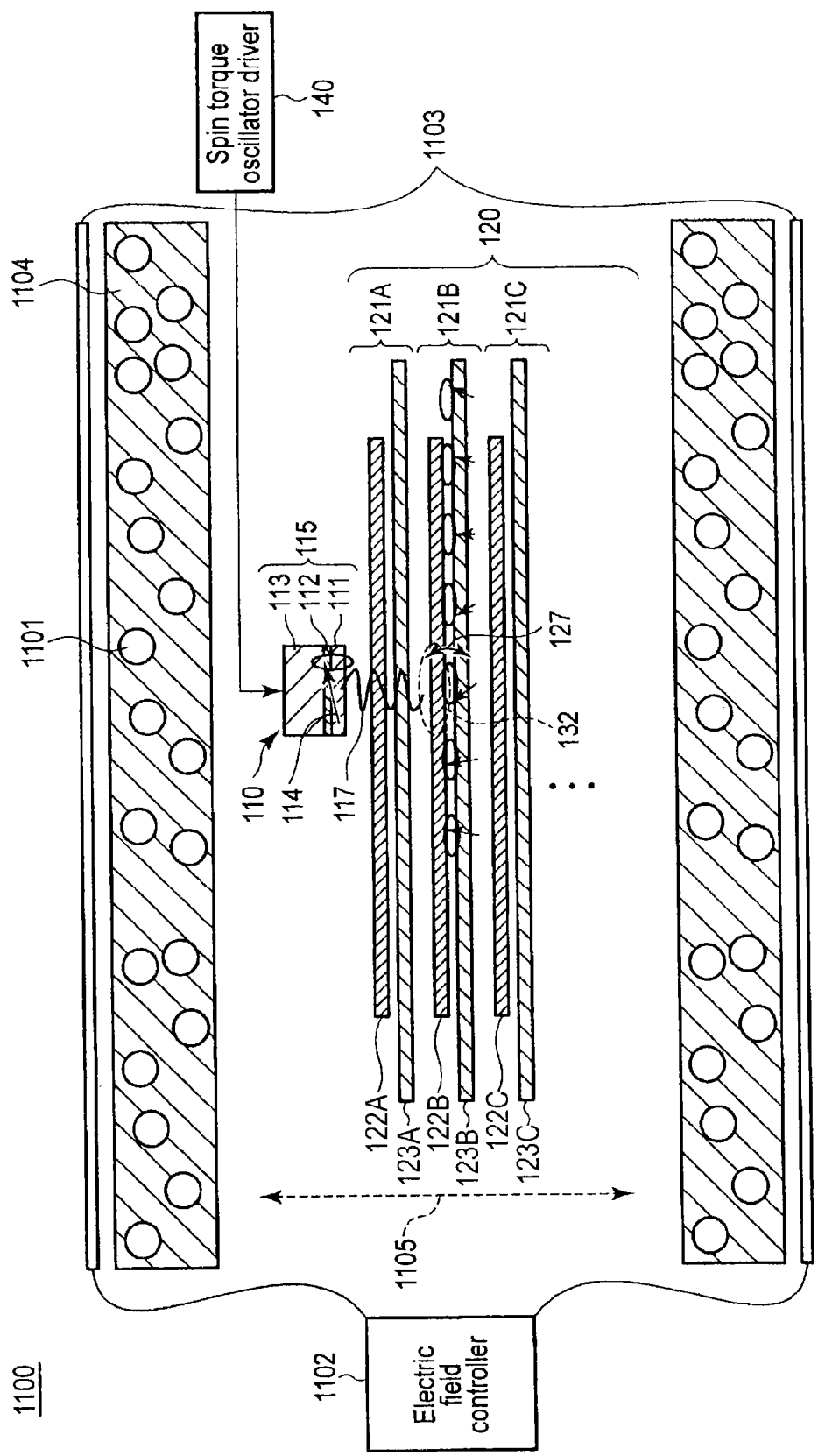
FIG. 11 is a sectional view schematically showing another example of the polarity-variable magnet shown in FIG. 9.

FIG. 11 schematically shows a magnetic recording apparatus 1100 according to the second example of this embodiment. As shown in FIG. 11, the magnetic recording apparatus 1100 includes a spin torque oscillator 110, a recording medium unit 120, packages 1104 in which a plurality of magnetic particles 1101 flow in a medium, a pair of electrodes 1103, and an electric field controller 1102. In the second example, the packages 1104 in which the plurality of magnetic particles 1101 flow in the medium and the pair of electrodes 1103 implement a polarity-variable magnet.

The structure including the spin torque oscillator 110 and recording medium unit 120 is arranged between the packages 1104. The electric field controller 1102 controls a voltage to be applied to the pair of electrodes 1103. The pair of electrodes 1103 function as a parallel-plate capacitor, and apply an electric field to the space sandwiched between the electrodes 1103. The magnetic particles 1101 have a magnetic moment M and electric polarization P, and flow in accordance with the direction of the electric field from the pair of electrodes 1103. Consequently, the magnetic moments of the plurality of magnetic particles 1101 are arranged in the same direction, and a magnetic field 1105 generated from the plurality of magnetic particles 1101 having the same magnetic moment direction acts on the structure including the spin torque oscillator 110 and recording medium unit 120. The direction of the magnetic field 1105 can be changed by the direction of the electric field generated by the electrodes 1103.

The operation of the electric field controller 1102 is synchronized with a driver for operating the spin torque oscillator 110 and a driver for operating spin-wave lines 123. In a write operation, therefore, the microwave assisting effect locally acts on a recording medium 122.

Figure 12:
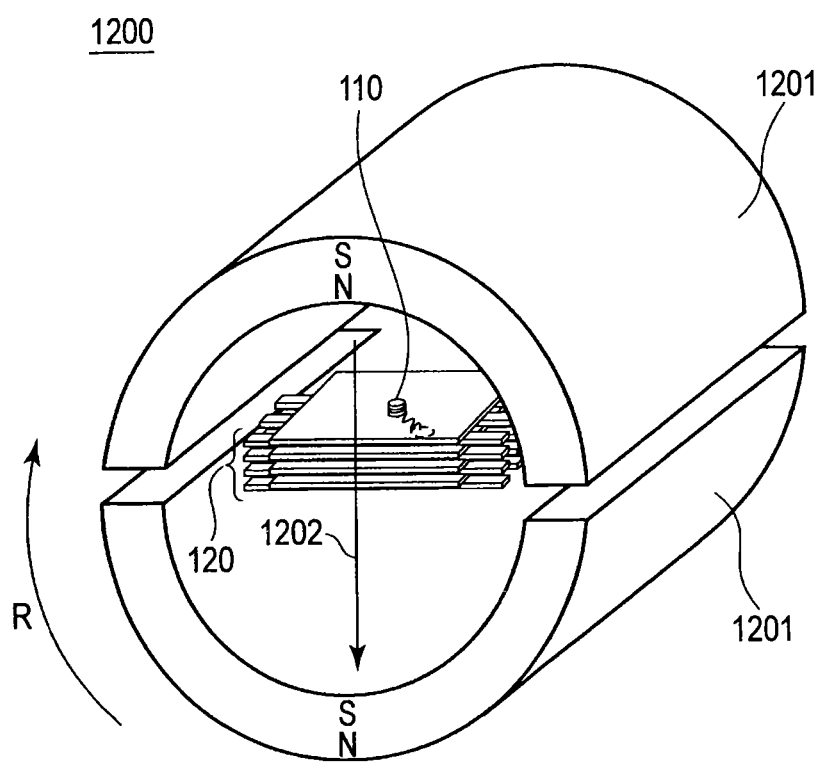
FIG. 12 is a perspective view schematically showing still another example of the polarity-variable magnet shown in FIG. 9.

FIG. 12 schematically shows a magnetic recording apparatus 1200 according to the third example of the sixth embodiment. As shown in FIG. 12, the magnetic recording apparatus 1200 includes a spin torque oscillator 110, a recording medium unit 120, and a pair of semicylindrical magnets 1201. In the third example, the pair of semicylindrical magnets 1201 implement a polarity-variable magnet.

The semicylindrical magnets 1201 are rotated in the direction of an arrow R shown in FIG. 12 by a rotating mechanism (not shown). A rotation driver (not shown) drives this rotating mechanism. The rotation of the semicylindrical magnets 1201 changes the direction of a magnetic field 1202 which acts on the structure including the spin torque oscillator 110 and recording medium unit 120.

In the example shown in FIG. 12, a recording medium 122 is a perpendicular magnetic recording medium. When revising the direction of medium magnetization from upward to downward, the rotation driver is operated at the write timing so as to arrange the semicylindrical magnets 1201 such that the direction of the write magnetic field 1202 is downward, as shown in FIG. 12. When reversing the direction of medium magnetization from downward to upward, the rotation driver is operated at the write timing so as to rotate the semicylindrical magnets 1201 through 180° from the arrangement shown in FIG. 12 so that the write magnetic field 1202 acts upward.

The operation of the rotation driver is synchronized with a driver for operating the spin torque oscillator 110 and a driver for operating spin-wave lines 123. Consequently, the microwave assisting effect locally acts on the recording medium 122 in a write operation.

As described above, the magnetic recording apparatus according to the sixth embodiment includes the polarity-variable magnet as a write magnetic field source, and the structure including the spin torque oscillator and recording medium unit is arranged under the magnetic field from the polarity-variable magnet. Accordingly, the write magnetic field can be applied to the recording medium.

Note that an aspect in which the write magnetic field source is prepared as a separate element is not limited to the examples described above with reference to FIGS. 9 to 12. It is, of course, also possible to use a recording head developed in the HDD microwave assisted recording technique using a so-called spin torque oscillator, as the write magnetic field source.

Figure 13:
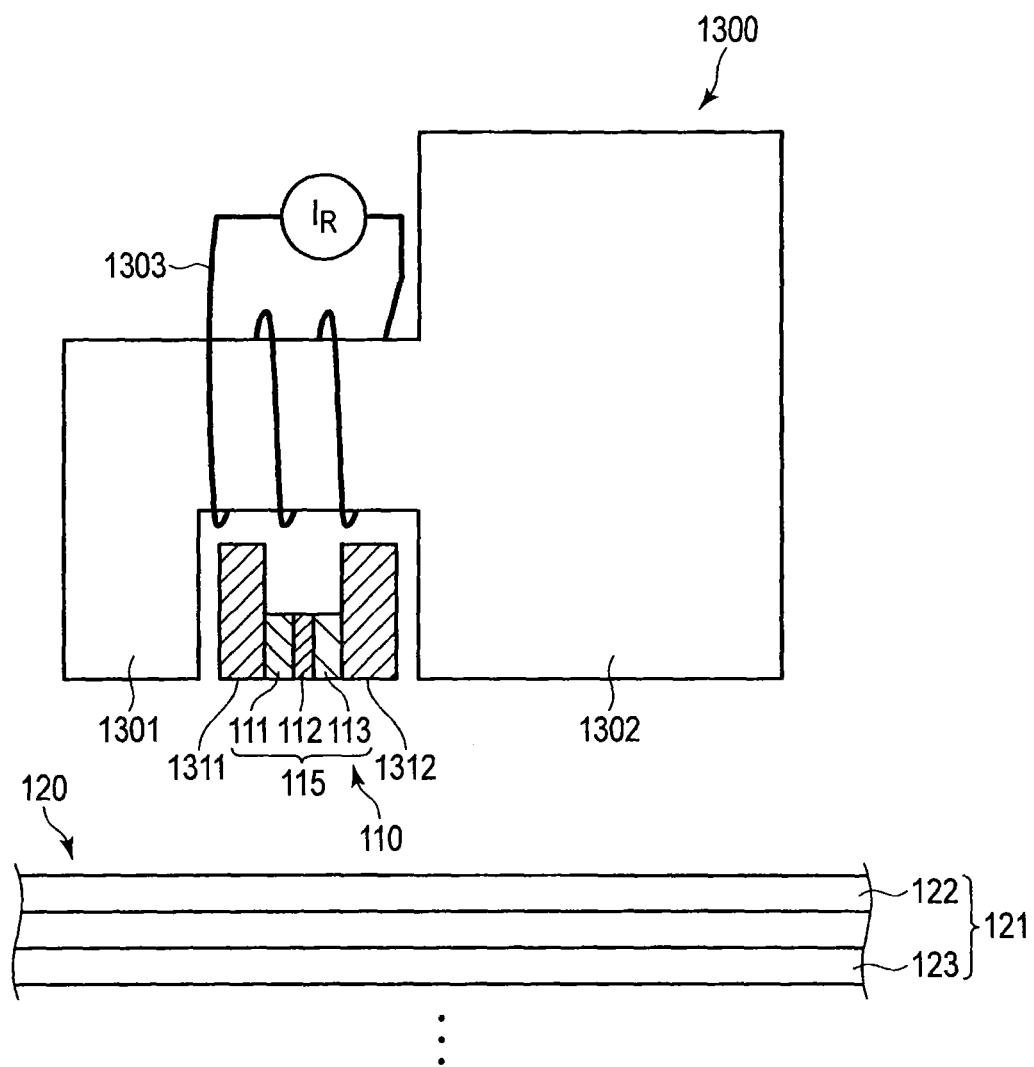
FIG. 13 is a sectional view schematically showing an example of a write magnetic field source.

FIG. 13 schematically shows a recording head 1300 mounted in a magnetic recording apparatus using the microwave assisted recording technique. As shown in FIG. 13, the recording head 1300 includes a main magnetic pole 1301, a return magnetic pole 1302, and a spin torque oscillator 110 arranged near the main magnetic pole 1301. The recording head 1300 is arranged opposite the recording medium unit 120. The main magnetic pole 1301 generates a write magnetic field to a recording medium unit 120. The return magnetic pole 1302 returns the write magnetic field from the recording medium unit 120 to the main magnetic pole 1301.

The spin torque oscillator 110 includes a magnetic multilayer film 115 including a first magnetic layer 111, a spacer layer 112, and a second magnetic layer 113, and a pair of electrodes 1311 and 1312 for supplying an electric current to the magnetic multilayer film 115. As described above, the spin torque oscillator 110 generates an oscillating magnetic field when a direct current is supplied to the magnetic multilayer film 115 via the electrodes 1311 and 1312. The spin torque oscillator 110 is arranged between the main magnetic pole 1301 and the return magnetic pole 1302. In the example shown in FIG. 13, the spin torque oscillator 110 is arranged such that the film plane of the magnetic multilayer film 115 are perpendicular to a direction from the main magnetic pole 1301 to the return magnetic pole 1302.

A portion of the main magnetic pole 1301 and a portion of the return magnetic pole 1302 are magnetically joined. A coil 1303 is provided on this magnetic junction between the main magnetic pole 1301 and return magnetic pole 1302. When an electric current $I_R$ flows through the coil 1303, the main magnetic pole 1301 generates a write magnetic field. Thus, the write magnetic field source may also be implemented as it is mounted in a recording head.

Seventh Embodiment

In the seventh embodiment, an example in which a plurality of spin torque oscillators corresponding to oscillating magnetic field sources are formed will be explained.

Figure 14:
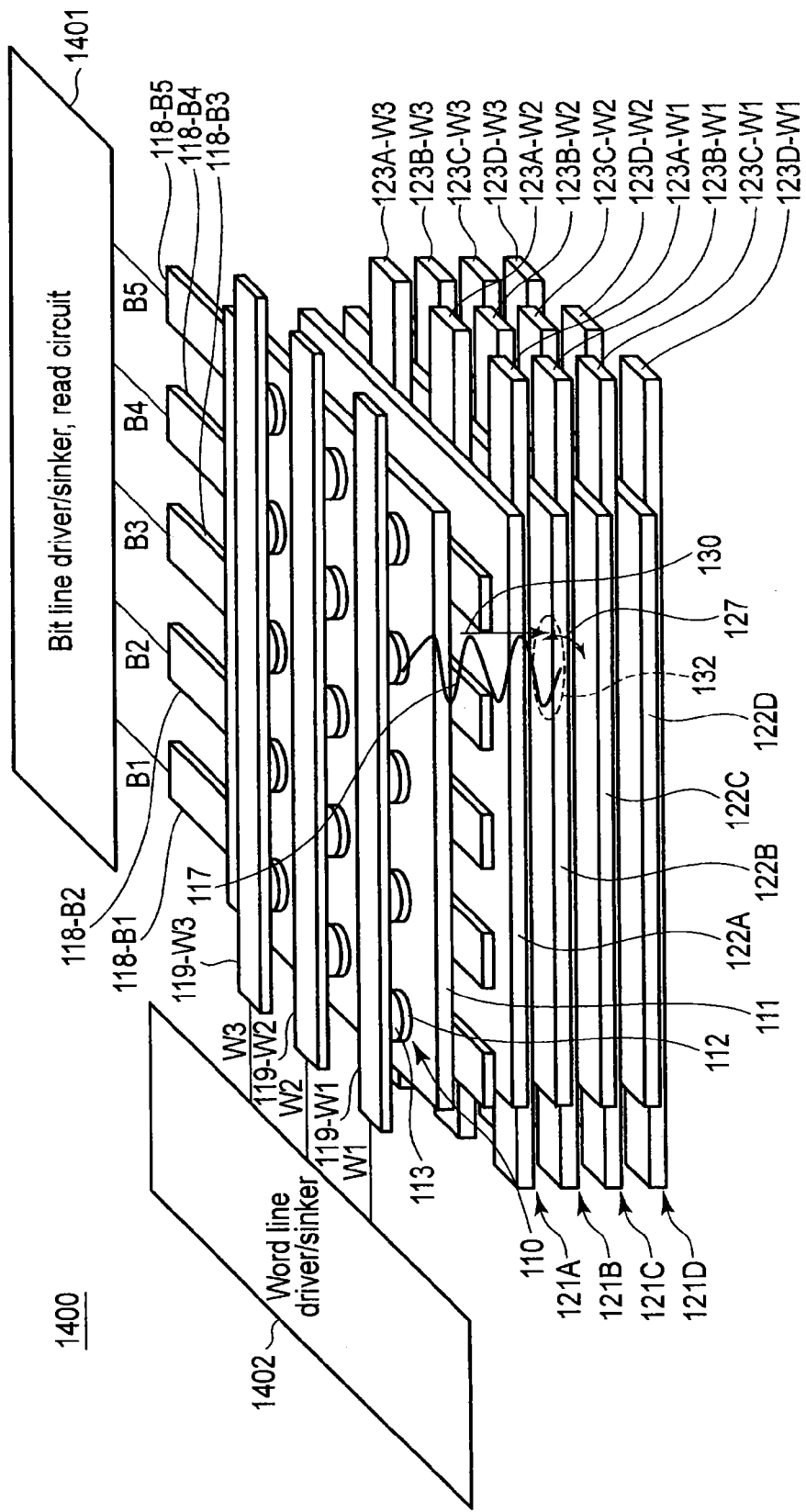
FIG. 14 is a perspective view schematically showing a magnetic recording apparatus according to the seventh embodiment.

FIG. 14 schematically shows a magnetic recording apparatus 1400 according to the seventh embodiment. As shown in FIG. 14, the magnetic recording apparatus 1400 includes a plurality of spin torque oscillators 110 and a recording medium unit 120. The plurality of spin torque oscillators 110 are arranged in an array so as to oppose the recording medium unit 120. The recording medium unit 120 includes one or more recording medium layers 121 which are stacked. In each recording medium layer 121, a plurality of spin-wave lines 123 are arranged parallel with each other and opposite the lower surface of a recording medium 122. In the example shown in FIG. 14, the recording medium unit 120 includes four recording medium layers 121A, 121B, 121C, and 121D. The recording medium layer 121A includes a recording medium 122A and spin-wave lines 123A-W1 to 123A-W3, the recording medium layer 121B includes a recording medium 122B and spin-wave lines 123B-W1 to 123B-W3, the recording medium layer 121C includes a recording medium 122C and spin-wave lines 123C-W1 to 123C-W3, and the recording medium layer 121D includes a recording medium 122D and spin-wave lines 123D-W1 to 123D-W3.

Each spin torque oscillator 110 is formed by a first magnetic layer 111, a spacer layer 112, and a second magnetic layer 113. The first magnetic layer 111 may be provided for each of the spin torque oscillators 110 or may be shared by the spin torque oscillators 110. The shape of the spin torque oscillator corresponds to a shape called a pillar shape in the former case, and a shape called a half-patterned shape in the latter case. In the example shown in FIG. 14, the first magnetic layer 111 is shared by the spin torque oscillators 110.

In the example shown in FIG. 14, fifteen spin torque oscillators 110 are arranged in three rows and five columns. In this arrangement, three electrodes 119 (e.g., electrodes 119-W1 to 119-W3) extending in the row direction are provided, five electrodes 118 (e.g., electrodes 118-B1 to 118-B5) extending in the column direction perpendicular to the row direction are provided, and the spin torque oscillators 110 are arranged between the electrodes 118 and 119. The electrodes 119-W1 to 119-w3 are connected to a word line driver/sinker 1402 via word lines W1 to W3. The electrodes 118-B1 to 118-B5 are connected to a bit line driver/sinker 1401 via bit lines B1 to B5. The drivers/sinkers 1401 and 1402 control currents flowing in the respective spin torque oscillators 110. The drivers/sinkers 1401 and 1402 function as parts of a recording controller. In this embodiment, terms "word" and "bit" are used as labels in accordance with terms used in the magnetic random access memory (MRAM) technology.

When operating one spin torque oscillator 110, one bit line and one word line corresponding to the spin torque oscillator are selected, and an electric current is supplied to the spin torque oscillator through the selected bit line and word line. FIG. 14 shows an example in which an electric current is supplied to the spin torque oscillator 110 through the bit line B4 and word line W1. In this example, the electric current flows through a path including the bit line B4, the electrode 118-B4, the first magnetic layer 111, the spacer layer 112, the second magnetic layer 113, electrode 119-W1, and word line W1. When the first magnetic layer 111 oscillates by this current supply, the recording medium 122 is irradiated with an oscillating magnetic field 117 generated by the spin torque oscillator 110. In a write operation, the spin-wave line 123 (e.g., the spin-wave line 123B-W1) is operated together with the spin torque oscillator 110. Consequently, a write magnetic field 130 reverses medium magnetization positioned in a portion 132 where the oscillating magnetic field 117 from the spin torque oscillator 110 and an oscillating magnetic field 127 from the spin-wave line 123 superpose each other.

As a method of operating the spin-wave line 123 in this embodiment, the same methods as those explained in the second, third, and fourth embodiments can be used. An example of the method of operating the spin-wave line 123 will briefly be explained below. As for a detailed explanation, see the descriptions in the second, third, and fourth embodiments.

In this example, as shown in FIG. 3, a spin torque oscillator portion 301 is provided at a part of each spin-wave line 123. In this case, the spin-wave line 123 is made of a metal ferromagnetic material. When a direct current is supplied to the spin-wave line 123 and the spin torque oscillator portion 301, a spin wave is generated in the spin-wave line 123, so the spin-wave line 123 generates the oscillating magnetic field 127. The arrangement of the spin torque oscillator portion 301 can be structured as shown in FIGS. 4A and 4B.

In another example, as shown in FIG. 5, a transmission line 502 is provided via an insulating layer 503 on parts of the spin-wave lines 123 in each recording medium layer 121. In this case, the spin-wave lines 123 are made of a metal ferromagnetic material. When an electric current is supplied to the transmission line 502, the transmission line 502 generates a pulse magnetic field corresponding to the current supply duration, and this pulse magnetic field excites spin waves in all the spin-wave lines 123 connected to the transmission line 502 via the insulating layer 503. As a consequence, the spin-wave lines 123 generate the oscillating magnetic fields 127.

In still another example, as shown in FIG. 6, a spin-wave generating electrode 602 is provided on parts of the spin-wave lines 123 in each recording medium layer 121. In this case, the spin-wave lines 123 are made of a magnetic insulating material. When an electric current is supplied to the spin-wave generating electrode 602, the spin-wave generating electrode 602 generates a pulse magnetic field corresponding to the current supply duration, and this pulse magnetic field excites spin waves in all the spin-wave lines 123 connected to the spin-wave generating electrode 602. As a consequence, the spin-wave lines 123 generate the oscillating magnetic fields 127.

Also, as a method of applying the write magnetic field 130, the same methods as those explained in the fifth and sixth embodiments can be used. The method of applying the write magnetic field 130 will briefly be explained below. As for a detailed explanation, see the descriptions in the fifth and sixth embodiments.

In one example, the spin-wave line 123 functions as a write magnetic field source. In this case, the spin-wave line 123 is made of a metal ferromagnetic material. When a direct current is supplied to the spin-wave line 123, a current magnetic field following from the Biot-Savart law is generated around the spin-wave line 123. This current magnetic field is used as the write magnetic field. The direction of the current magnetic field can be controlled by the direction of the direct current.

In another example, as shown in FIG. 9, a polarity-variable magnet 901 implements the write magnetic field source. In this case, the structure including the spin torque oscillator 110 and recording medium unit 120 is arranged under a magnetic field generated by the magnet 901. The magnetic field from the magnet 901 acts on the whole recording medium 122. The magnetic field from the magnet 901 is used as the write magnetic field.

In still another example, as shown in FIG. 13, a main magnetic pole 1301 mounted in a recording head according to the HDD microwave assisted recording technique using a spin torque oscillator implements the write magnetic field source. In the recording head, the main magnetic pole 1301 is juxtaposed with the spin torque oscillator 110.

In this embodiment, a recording medium as a write target is determined by selecting the spin-wave line 123, and a write position in the recording medium is determined by selecting the word line and the bit line. In this embodiment, the plurality of spin torque oscillators obviate the need for a movable portion such as an actuator in the conventional HDD. Accordingly, a solid-state magnetic recording apparatus having a high anti-shock property is obtained.

Eighth Embodiment

In the eighth embodiment, a method of reproducing data from a recording medium will be explained by taking a practical example.

The first reproduction method will be explained with reference to FIG. 15. The first reproduction method uses a magnetic resonance phenomenon, and reads magnetic data recorded in a recording bit 1501 of a recording medium 122 by using a spin torque oscillator 110 as a magnetic sensor. The recording media 122 have different magnetic resonance frequencies from each other. For example, the magnetization of a recording bit 1501A in a recording medium 122A has a magnetic resonance frequency $f_A$, the magnetization of a recording bit 1501B in a recording medium 122B has a magnetic resonance frequency $f_B$, and the magnetization of a recording bit 1501C in a recording medium 122C has a magnetic resonance frequency $f_C$. In the example, the magnetic resonance frequencies are so set as to decrease toward the recording medium 122 closest to the spin torque oscillator 110. That is, $f_A < f_B < f_C$.

Figure 15:
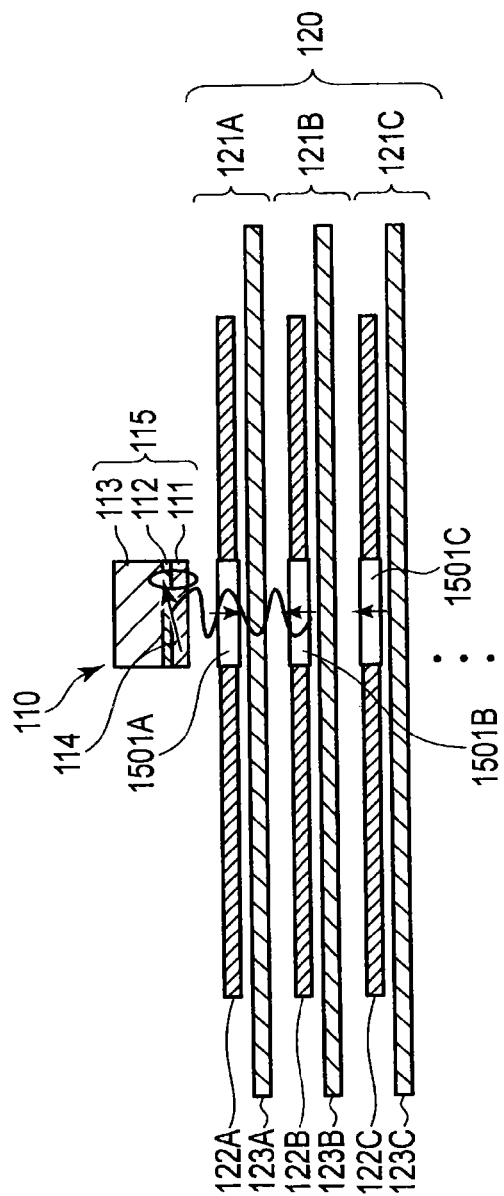
FIG. 15 is a view for explaining an example of an operation of reproducing data in the magnetic recording apparatus shown in FIG. 1.

An operation of reading magnetic data recorded in the recording bit 1501B of the recording medium 122B as shown in FIG. 15 will be explained. When reproducing magnetic data, magnetization 114 of a first layer 111 is oscillated by supplying an electric current to the spin torque oscillator 110. When reproducing data from the recording bit 1501B, the oscillation frequency of the spin torque oscillator 110 is set at $f_B$ in order to set the frequency of an oscillating magnetic field 117 generated by the spin torque oscillator 110 at $f_B$. The oscillation frequency of the spin torque oscillator 110 is controlled by, e.g., the magnitude of an electric current. The recording medium 122 from which recorded data is to be reproduced is selected by setting the oscillation frequency of the spin torque oscillator 110.

When the oscillating magnetic field 117 having the frequency $f_B$ from the spin torque oscillator 110 is applied, the magnetization of the recording bit 1501B excites by resonance. Accordingly, energy is partially transferred from the spin torque oscillator 110 to the recording bit 1501B. More specifically, in magnetic resonance, the magnetization of the recording bit 1501B absorbs the energy of the oscillating magnetic field 117, and the spin torque oscillator 110 loses energy due to the resonance absorption by the magnetic bit 1501B. Consequently, the oscillation amplitude (output voltage) of the spin torque oscillator 110 changes. Magnetic data is reproduced by detecting this change in oscillation amplitude. Since the oscillating magnetic field 117 from the spin torque oscillator 110 has deflection, the magnitude of the resonance excitation changes in accordance with whether the data recorded in the recording bit 1501B is "0" or "1". This is so because if the magnetization direction in the recording bit 1501B changes, deflection for the magnetization generally changes to a greater or lesser extent. The difference between the resonance excitation magnitudes corresponding to bits "0" and "1" appears as a change in oscillation amplitude of the spin torque oscillator 110. "0" or "1" is reproduced by detecting this change.

Note that in order to increase the difference between the resonance absorption magnitudes produced by the difference between the medium magnetization directions, it is also possible to operate the write magnetic field source explained in the fifth or sixth embodiment, and apply a magnetic field for shifting the magnetic resonance frequency of a bit to the recording medium unit 120 in a write operation. For example, under an upward magnetic field having a magnitude H, a frequency difference of $(\gamma/2\pi) \times 2H$ simply appears between the resonance frequency of upward medium magnetization and that of downward medium magnetization. $\gamma$ is a gyromagnetic ratio. As the frequency difference increases, it becomes easier to distinguish between bits "0" and "1", and the S/N ratio of reproduction increases. To best utilize the method of shifting the magnetic resonance frequency of a bit, no significant stray magnetic field desirably acts between the recording magnetic layers 121 in order to avoid the interference of magnetic resonance frequencies under the magnetic field of each bit of each recording medium 122. For example, the medium film of the recording medium 122 is formed by an antiferromagnetically coupled film such as $[CoPt]_n/Ru/[CoPt]_m$ so that stray magnetic fields from two ferromagnetic layers ($[CoPt]_{n,m}$) cancel each other out. This makes it possible to prevent a significant stray magnetic field from acting between the recording medium layers 121. Alternatively, it is desirable to set a magnetic field having an appropriate magnitude capable of avoiding interference, by taking account of the magnetic resonance frequency unique to the recording medium material.

Figure 16:
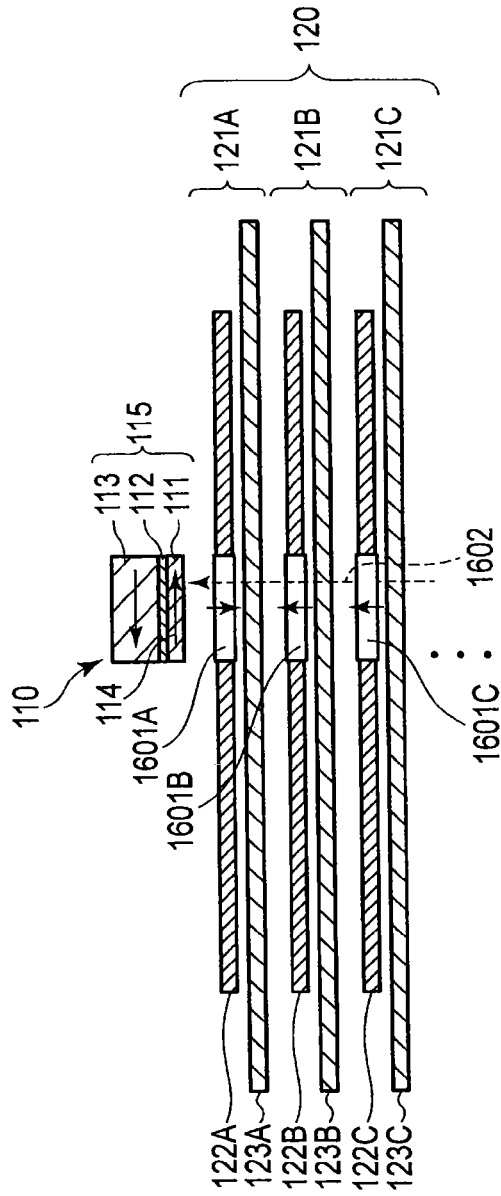
FIG. 16 is a view for explaining another example of the operation of reproducing data in the magnetic recording apparatus shown in FIG. 1.

Next, the second reproduction method will be explained with reference to FIG. 16. The second reproduction method reads magnetic data by detecting a stray magnetic field 1602 from the recording medium 122 by using the spin torque oscillator 110.

The stray magnetic field 1602 from the recording medium 122 in the recording medium unit 120 acts on the spin torque oscillator 110. The stray magnetic field 1602 mainly contains magnetic fields from recording bits 1601A, 1601B, and 1601C positioned immediately below the spin torque oscillator 110. The recording bits 1601A, 1601B, and 1601C are recording bits of the recording media 122A, 122B, and 122C, respectively. The magnitude of the stray magnetic field 1602 changes in accordance with a combination of the magnetization directions of the recording bits 1601A, 1601B, and 1601C. In the example shown in FIG. 16, the magnetization directions of the recording bits 1601A, 1601B, and 1601C are respectively downward, upward, and upward. Letting N be the number of recording medium layers 121, the number of combinations of the medium magnetization directions is $2^N$ where N is a positive integer.

When the spin torque oscillator 110 is operated, the magnetoresistance effect between the magnetization of a first magnetic layer 111 and that of a second magnetic layer 113 generates a high-frequency voltage between a pair of electrodes for supplying an electric current to a magnetic multilayer film 115. The frequency of the high-frequency voltage corresponds to the oscillation frequency (a few GHz to a few ten GHz) of the spin torque oscillator 110. This high-frequency voltage is output as an oscillation output. The oscillation output is characterized by the amplitude and phase. The oscillation output changes in accordance with a magnetic field environment in which the spin torque oscillator 110 exists. That is, the oscillation output depends on the magnitude of the stray magnetic field 1602 from the recording medium unit 120. Accordingly, the magnitude of the stray magnetic field 1602 can be measured by detecting the oscillation output (at least one of the amplitude and phase). The magnetization direction of a desired recording bit (e.g., the recording bit 1601C) can be specified based on the measured magnitude of the stray magnetic field 1602. Consequently, data recorded in the desired recording bit can be reproduced. Letting N be the number of recording medium layers 121, it is possible to simply and effectively utilize the recording resources of the recording medium unit 120 if the number of levels for distinguishing between oscillation outputs is $2^N$.

The third reproduction method will be explained with reference to FIG. 16. Like the second reproduction method, the third reproduction method reads magnetic data by detecting the stray magnetic field 1602 from the recording medium 122 by using the spin torque oscillator 110. The third reproduction method differs from the second reproduction method in that the spin torque oscillator 110 functions as a magnetoresistance effect element.

In the third reproduction method, an electric current having a current density equal to or lower than a threshold current density for oscillating the spin torque oscillator 110 is supplied to it. In this case, the operation of the spin torque oscillator 110 is the same as that of a magnetoresistance effect element such as a GMR element or TMR element. The resistance of the spin torque oscillator 110 changes in accordance with the stray magnetic field 1602 from the recording medium 122. Accordingly, the stray magnetic field 1602 from the recording medium 122 can be measured by detecting the resistance change of the spin torque oscillator 110 as a magnetoresistance effect element. The magnetization direction of a desired recording bit (e.g., the recording bit 1601C) can be specified based on the measured magnitude of the stray magnetic field 1602. Consequently, data recorded in the desired recording bit can be reproduced. Letting N be the number of recording medium layers 121, it is possible to simply and effectively utilize the recording resources of the recording medium unit 120 if the number of levels for distinguishing between resistance values is $2^N$.

As described above, in the eighth embodiment, the spin torque oscillator used as an assist source in a write operation can also be used to reproduce magnetic data.

In the magnetic recording apparatus according to at least one of the above-described embodiments, two kinds of oscillating magnetic field sources, i.e., the spin torque oscillator 110 and spin-wave line 123 are provided. Accordingly, a strong oscillating magnetic field capable of obtaining the microwave assisting effect can be applied to a desired medium magnetization.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic recording apparatus comprising:
a spin torque oscillator which generates a first oscillating magnetic field;
a recording medium unit comprising one or more recording medium layers which are stacked, each of the one or more recording medium layers including a recording medium and a plurality of spin-wave lines which are provided opposite the recording medium and each of which generates a second oscillating magnetic field;
a write magnetic field source which generates a write magnetic field; and
a controller which drives the spin torque oscillator and at least one of the plurality of spin-wave lines such that the first oscillating magnetic field and the second oscillating magnetic field are simultaneously applied to target medium magnetization in the recording medium on which data is to be recorded, to selectively reverse the target medium magnetization with the write magnetic field.

2. The apparatus according to claim 1, wherein the plurality of spin-wave lines are made of a metal ferromagnetic material, and a plurality of spin torque oscillator portions configured to excite spin waves are provided at parts of the plurality of spin-wave lines.

3. The apparatus according to claim 2, wherein the write magnetic field is a current magnetic field generated by supplying an electric current to at least one of the plurality of spin-wave lines.

4. The apparatus according to claim 1, wherein the plurality of spin-wave lines are made of a metal ferromagnetic material, and a transmission line configured to generate a magnetic field when an electric current is supplied is provided on parts of the plurality of spin-wave lines via an insulator.

5. The apparatus according to claim 4, wherein the write magnetic field is a current magnetic field generated by supplying an electric current to at least one of the plurality of spin-wave lines.

6. The apparatus according to claim 1, wherein the plurality of spin-wave lines are made of a magnetic insulating material, and an electrode configured to generate a magnetic field when an electric current is supplied is provided on parts of the plurality of spin-wave lines.

7. The apparatus according to claim 1, wherein the write magnetic field source comprises a polarity-variable magnet, and a structure including the spin torque oscillator and the recording medium unit is arranged under the write magnetic field.

8. The apparatus according to claim 1, wherein the write magnetic field source comprises a main magnetic pole which is provided near the spin torque oscillator and generates the write magnetic field.

9. The apparatus according to claim 1, comprising a plurality of spin torque oscillators arranged into an array to oppose the recording medium unit.

10. The apparatus according to claim 1, wherein one or more recording media of the one or more recording medium layers have different magnetic resonance frequencies from each other, and data recorded in the recording medium unit is reproduced by selectively resonating a recording medium by the first oscillating magnetic field.

11. The apparatus according to claim 1, wherein data recorded in the recording medium unit is reproduced by detecting a stray magnetic field from the recording medium using the spin torque oscillator while the spin torque oscillator is oscillating.

12. The apparatus according to claim 1, wherein data recorded in the recording medium unit is reproduced by detecting a stray magnetic field from the recording medium using the spin torque oscillator as a magnetoresistance effect element without oscillating.

* * * * *